US009654515B2

(12) United States Patent
Maes

(10) Patent No.: US 9,654,515 B2
(45) Date of Patent: May 16, 2017

(54) SERVICE ORIENTED ARCHITECTURE-BASED SCIM PLATFORM

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 674 days.

(21) Appl. No.: 12/018,718

(22) Filed: Jan. 23, 2008

(65) Prior Publication Data

US 2009/0187919 A1 Jul. 23, 2009

(51) Int. Cl.
G06F 9/54 (2006.01)
H04L 29/06 (2006.01)

(52) U.S. Cl.
CPC ...... H04L 65/1016 (2013.01); H04L 65/1006 (2013.01); H04L 65/1069 (2013.01)

(58) Field of Classification Search
None
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,737,321 A | 4/1998 | Takahashi |
| 5,786,770 A | 7/1998 | Thompson |
| 5,850,517 A | 12/1998 | Verkler et al. |
| 5,867,665 A | 2/1999 | Butman et al. |
| 5,946,634 A | 8/1999 | Korpela |

(Continued)

FOREIGN PATENT DOCUMENTS

| | | |
|---|---|---|
| EP | 2 034 748 A1 | 3/2009 |
| WO | 2007134468 A1 | 11/2007 |

(Continued)

OTHER PUBLICATIONS

Maretzke, Michael, "JAIN SLEE Technology Overview", <http://www.maretzke.de/pub/lectures/jslee_overview_2005/JSLEE_OVERVIEW_2005.pdf>, Apr. 12, 2005, 26 pages.

(Continued)

*Primary Examiner* — Shih-Wei Kraft
(74) *Attorney, Agent, or Firm* — Kilpatrick Townsend & Stockton LLP

(57) ABSTRACT

Service Capability Interaction Manager (SCIM)-type functionality is provided at a horizontal service layer in an Service Oriented Architecture (SOA)-based approach. SCIM composition is provided at multiple levels, including the level of composition where servlets have full access to the context information of the service layer. SCIM composition also occurs at the level of an application dispatching messages to multiple applications/services for processing the messages. The functionality at the service layer also can be programmed using policies, such that routing decisions can be made dynamically as the result of processing conditions and actions. An incoming message can result in a Web service being triggered that in turn triggers a BPEL or SOA workflow, the workflow calling multiple operations to process the message as a result of a routing table or header, environmental and contextual information at the service level, and other information such as user preference or presence information.

24 Claims, 12 Drawing Sheets

(56) References Cited

U.S. PATENT DOCUMENTS

| | | |
|---|---|---|
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,463,462 B1 | 10/2002 | Smith et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,611,867 B1 | 8/2003 | Bowman-Amuah |
| 6,633,560 B1* | 10/2003 | Tiwari et al. ............ 370/351 |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1 | 11/2004 | Byrne et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,269,162 B2 | 9/2007 | Turner |
| 7,269,431 B1 | 9/2007 | Gilbert |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2* | 10/2008 | Marvin ............ 717/116 |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,904,909 B1 | 3/2011 | Reiner et al. |
| 7,925,727 B2 | 4/2011 | Sullivan et al. |
| 7,933,397 B2 | 4/2011 | Jain |
| 8,023,971 B2 | 9/2011 | Egli |
| 8,027,921 B1 | 9/2011 | Boydstun et al. |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes et al. |
| 8,370,506 B2 | 2/2013 | Maes |
| 8,386,609 B2 | 2/2013 | Anand et al. |
| 8,401,009 B1 | 3/2013 | Dorsey et al. |
| 8,401,022 B2 | 3/2013 | Maes et al. |
| 8,458,703 B2 | 6/2013 | Maes |
| 8,478,311 B2 | 7/2013 | Sennett et al. |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 8,849,685 B2 | 9/2014 | Oden |
| 8,879,547 B2 | 11/2014 | Maes |
| 8,914,493 B2 | 12/2014 | Maes et al. |
| 8,918,493 B1 | 12/2014 | Beach et al. |
| 9,038,082 B2 | 5/2015 | Maes |
| 9,083,599 B2 | 7/2015 | Huuhtanen |
| 9,088,570 B2 | 7/2015 | Anderson |
| 9,245,236 B2 | 1/2016 | Maes |
| 9,269,060 B2 | 2/2016 | Maes |
| 2001/0010053 A1* | 7/2001 | Ben-Shachar et al. ....... 709/105 |
| 2001/0016880 A1* | 8/2001 | Cai et al. ............ 709/321 |
| 2001/0028649 A1 | 10/2001 | Pogossiants et al. |
| 2002/0002684 A1 | 1/2002 | Fox et al. |
| 2002/0004827 A1 | 1/2002 | Ciscon |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120697 A1 | 8/2002 | Generous et al. |
| 2002/0120729 A1* | 8/2002 | Faccin et al. ............ 709/223 |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1* | 1/2003 | Amin ............ 709/202 |
| 2003/0023953 A1 | 1/2003 | Lucassen et al. |
| 2003/0046316 A1 | 3/2003 | Gergic et al. |

(56) References Cited

U.S. PATENT DOCUMENTS

| | | |
|---|---|---|
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1* | 6/2003 | Robb et al. ............... 705/1 |
| 2003/0131069 A1 | 7/2003 | Lucovsky et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0182550 A1 | 9/2003 | Chen |
| 2003/0185233 A1 | 10/2003 | Ji et al. |
| 2003/0191769 A1 | 10/2003 | Crisan et al. |
| 2003/0191823 A1* | 10/2003 | Bansal et al. ............. 709/220 |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0019695 A1 | 1/2004 | Fellenstein et al. |
| 2004/0024720 A1 | 2/2004 | Fairweather |
| 2004/0044647 A1 | 3/2004 | Salmenkaita |
| 2004/0054718 A1 | 3/2004 | Hicks |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1* | 3/2005 | Honeisen et al. .......... 709/224 |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0114533 A1 | 5/2005 | Hullfish et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0204391 A1 | 9/2005 | Hunleth |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031441 A1* | 2/2006 | Davis et al. ............... 709/223 |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0047753 A1 | 3/2006 | Pal |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1* | 5/2006 | Emery et al. ............ 379/211.04 |
| 2006/0112400 A1* | 5/2006 | Zhang et al. ................. 719/328 |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1* | 7/2006 | Ramachandran et al. .... 370/352 |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0205393 A1 | 9/2006 | Veen |
| 2006/0210033 A1 | 9/2006 | Grech et al. |
| 2006/0212574 A1 | 9/2006 | Maes |
| 2006/0229078 A1* | 10/2006 | Itzkovitz et al. ............. 455/445 |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1* | 2/2007 | Tai et al. ...................... 709/223 |
| 2007/0047534 A1 | 3/2007 | Hakusui |
| 2007/0061397 A1* | 3/2007 | Gregorat et al. ............. 709/203 |
| 2007/0071224 A1 | 3/2007 | Shtivelman et al. |
| 2007/0088836 A1* | 4/2007 | Tai et al. ...................... 709/227 |
| 2007/0099613 A1 | 5/2007 | Burgan et al. |
| 2007/0100831 A1 | 5/2007 | Cox |
| 2007/0100981 A1* | 5/2007 | Adamczyk et al. .......... 709/223 |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1* | 5/2007 | Millefiorini et al. ......... 709/225 |
| 2007/0118662 A1* | 5/2007 | Vishwanathan et al. ..... 709/227 |
| 2007/0121539 A1 | 5/2007 | Kikuchi |
| 2007/0123297 A1 | 5/2007 | Chan |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1* | 8/2007 | Modarressi ................... 709/223 |
| 2007/0197227 A1* | 8/2007 | Naqvi et al. .................. 455/445 |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1* | 1/2008 | Bogineni et al. ............. 370/389 |
| 2008/0025243 A1 | 1/2008 | Corneille et al. |
| 2008/0037747 A1* | 2/2008 | Tucker ..................... 379/201.12 |
| 2008/0043764 A1 | 2/2008 | Miloslavsky et al. |
| 2008/0049929 A1 | 2/2008 | Miloslavsky et al. |
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1* | 5/2008 | Rosenberg et al. ........... 709/225 |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1 | 7/2008 | Marvin et al. |

(56) References Cited

U.S. PATENT DOCUMENTS

| | | |
|---|---|---|
| 2008/0168523 A1 | 7/2008 | Ansari et al. |
| 2008/0171549 A1 | 7/2008 | Hursey et al. |
| 2008/0175251 A1 | 7/2008 | Oouchi et al. |
| 2008/0175357 A1* | 7/2008 | Tucker ................ 379/93.01 |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0271039 A1 | 10/2008 | Rolia et al. |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0292074 A1 | 11/2008 | Boni et al. |
| 2008/0293389 A1 | 11/2008 | Chin et al. |
| 2008/0301135 A1 | 12/2008 | Alves et al. |
| 2008/0307108 A1 | 12/2008 | Yan et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0119672 A1 | 5/2009 | Bussard et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0185576 A1 | 7/2009 | Kisel et al. |
| 2009/0190603 A1 | 7/2009 | Damola et al. |
| 2009/0192992 A1 | 7/2009 | Arthursson |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1 | 9/2009 | Paval |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Gonzalez et al. |
| 2010/0128696 A1 | 5/2010 | Fantini et al. |
| 2010/0153865 A1 | 6/2010 | Barnes et al. |
| 2010/0179995 A1 | 7/2010 | Wang |
| 2010/0185772 A1* | 7/2010 | Wang et al. ................ 709/227 |
| 2010/0192004 A1 | 7/2010 | Bauchot et al. |
| 2010/0235844 A1 | 9/2010 | Arwe et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1 | 6/2011 | Noldus et al. |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2011/0280383 A1 | 11/2011 | Varga et al. |
| 2012/0045040 A1 | 2/2012 | Maes |
| 2012/0047506 A1 | 2/2012 | Maes |
| 2012/0106728 A1 | 5/2012 | Ghaffari et al. |
| 2012/0173745 A1 | 7/2012 | Maes |

FOREIGN PATENT DOCUMENTS

| | | |
|---|---|---|
| WO | 2008111027 | 12/2008 |
| WO | 2008146097 | 12/2008 |

OTHER PUBLICATIONS

O'Doherty, Phelim, "JSLEE—SIP Servlet", <http://java.sun.com/products/jain/JSLEE-SIPServlet.pdf, 2003, 13 pages.

The Parlay Group, "Specifications", <http://web.archive.org/web/20050114014707/www.parlay.org/specs/index.asp>, Jan. 14, 2005, 2 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Office Action mailed Nov. 10, 2010, 12 pages.

U.S. Appl. No. 12/019,299, filed Jan. 24, 2008, Advisory Action dated Dec. 9, 2010, 3 pages.

U.S. Appl. No. 12/019,299, filed Jan. 24, 2008, Office Action mailed Jan. 24, 2011, 16 pages.

U.S. App. No. 10/855,999, filed May 28, 2004, Final Office Action dated Jan. 5, 2011, 19 pages.

U.S. Appl. No. 11/123,468, filed May 5, 2005, Advisory Action dated Jan. 18, 2011, 2 pages.

U.S. Appl. No. 12/364,642, filed Feb. 3, 2009, Office Action dated Dec. 20, 2010, 18 pages.

U.S. Appl. No. 11/357,653, filed Feb. 16, 2000, Office Action dated Jan. 20, 2011, 18 pages.

Wikipedia, "Parlay", <http://web.archive.org/web/20050130172632/en.wikipedia.org/wiki/Parlay>, Jan. 30, 2005, 3 pages.

Wikipedia, "Object-Oriented Programming", <http://web.archive.org/web/20051211141918/http://en.wikipedia.org/wiki/Object-oriented_programming>, Dec. 11, 2005, 10 pages.

Wikipedia, "OSI model", <http://web.archive.org/web/20050907132012/http://en.wikipedia.org/wiki/Osi_model>, Sep. 7, 2005, 8 pages.

U.S. Appl. No. 11/848,347, filed Aug. 31, 2007, Final Office Action mailed Mar. 7, 2011, 21 pages.

U.S. Appl. No. 11/926,738, filed Oct. 29, 2007, Final Office Action mailed Mar. 17, 2011, 13 pages.

U.S. Appl. No. 11/943,101, filed Nov. 20, 2007, Final Office Action mailed Feb. 14, 2011, 11 pages.

U.S. Appl. No. 12/544,459, filed Aug. 20, 2009, Office Action dated Mar. 2, 2011, 10 pages.

U.S. Appl. No. 10/855,999, filed May 28, 2004, Advisory Action dated Mar. 16, 2011, 3 pages.

U.S. Appl. No. 11/024,160, filed Dec. 27, 2004, Office Action dated Feb. 7, 2011, 11 pages.

U.S. Appl. No. 11/939,705, filed Nov. 14, 2007, Final Office Action mailed Mar. 17, 2011, 21 pages.

U.S. Appl. No. 11/848,347, filed Aug. 31, 2007, Office Action mailed Oct. 29, 2009, 12 pages.

U.S. Appl. No. 11/951,500, filed Dec. 6, 2007, Office Action mailed Sep. 22, 2009, 24 pages.

U.S. Appl. No. 11/951,500 filed Dec. 6, 2007, Final Office Action mailed Mar. 30, 2010, 26 pages.

U.S. Appl. No. 11/877,129, filed Oct. 23, 2007, Office Action mailed Sep. 28, 2009, 15 pages.

U.S. Appl. No. 11/877,129, filed Oct. 23, 2007, Final Office Action mailed Mar. 29, 2010, 17 pages.

(56) References Cited

OTHER PUBLICATIONS

U.S. Appl. No. 11/926,738, filed Oct. 29, 2007, Office Action mailed Feb. 24, 2010, 12 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/WAP Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 Pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.

(56) References Cited

OTHER PUBLICATIONS

U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action mailed May 23, 2011, 18 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220 filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/848,347, filed Aug. 31, 2007, Notice of Allowance mailed Mar. 2, 2012, 9 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Advisory Action mailed Feb. 27, 2012, 3 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Office Action dated Apr. 26, 2012, 18 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Advisory Action dated Feb. 9, 2012, 2 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Notice of Allowance mailed Mar. 19, 2012, 19 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Advisory Action mailed Jan. 5, 2012, 3 pages.
U.S. Appl. No. 11/969,343, filed Jan. 4, 2008, Final Office Action mailed Oct. 21, 2011, 11 pages.
U.S. Appl. No. 12/014,387, filed Jan. 15, 2008, Final Office Action mailed Apr. 5, 2012, 17 pages.
U.S. Appl. No. 12/014,387, filed Jan. 15, 2008, Office Action mailed Sep. 7, 2011, 18 pages.
U.S. Appl. No. 12/019,299, filed Jan. 24, 2008, Final Office Action mailed Aug. 25, 2011, 20 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 13/416,413, filed Mar. 9, 2012, Office Action mailed Apr. 27, 2012, 11 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
3rd Generation Partnership Project 2, "Presence Service: Architecture and Functional Description", doc. No. 3GPP2 X.50027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.

(56) References Cited

OTHER PUBLICATIONS

U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 11/939,705, filed Nov. 14, 2007, Notice of Allowance mailed May 15, 2013, 92 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 10/855,999, filed May 28, 2004, Final Office Action dated Nov. 18, 2013, 14 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 12/014,387, filed Jan. 15, 2008, Notice of Allowance mailed Oct. 25, 2013, 17 pages.
U.S. Appl. No. 12/791,129, filed Jun. 1, 2010,, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010 Non-Final Office Action mailed Oct. 1, 2013, 10 pages.
U.S. Appl. No. 11/357,653, Non Final Office Action mailed on Mar. 27, 2014, 19 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on Jul. 3, 2013, 6 pages.
U.S. Appl. No. 12/019,335, Non Final Office Action mailed on Jul. 26, 2013, 19 pages.
U.S. Appl. No. 12/045,220, Final Office Action mailed on Apr. 18, 2014, 20 pages.
U.S. Appl. No. 12/544,484, Non Final Office Action mailed on May 8, 2014, 13 pages.
U.S. Appl. No. 12/791,129, Advisory Action mailed on Mar. 6, 2014, 3 pages.
U.S. Appl. No. 12/791,129, Notice of Allowance mailed on Apr. 24, 2014, 9 pages.
U.S. Appl. No. 12/949,183, Final Office Action mailed on Jan. 21, 2014, 16 pages.
U.S. Appl. No. 12/949,183, Advisory Action mailed on Apr. 10, 2014, 3 pages.
U.S. Appl. No. 12/957,697, Non-Final Office Action mailed on Mar. 20, 2014, 12 pages.
U.S. Appl. No. 12/957,740, Final Office Action mailed on Feb. 19, 2014, 18 pages.
U.S. Appl. No. 13/029,219, Non Final Office Action mailed on Apr. 11, 2014, 23 pages.
U.S. Appl. No. 13/029,226, Final Office Action mailed on Jan. 30, 2014, 12 pages.
U.S. Appl. No. 13/029,226, Advisory Action mailed on Apr. 7, 2014, 3 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable learning repositories, Proceedings of the 1st Workshop on Interoperability of Web-based Educational Systems, 2005, pp. 11-18.
U.S. Appl. No. 12/957,697, Non-Final Office Action mailed on Jul. 2, 2014, 9 pages.
U.S. Appl. No. 12/019,335, filed Jan. 24, 2008, Final Office Action mailed Jan. 14, 2014, 33 pages.
U.S. Appl. No. 11/357,653, filed Feb. 16, 2006, Final Office Action dated Nov. 26, 2013, 25 pages.
U.S. Appl. No. 11/969,343, filed Jan. 4, 2008, Notice of Allowance mailed Jan. 16, 2014, 6 pages.
U.S. Appl. No. 12/791,129, filed Jun. 1, 2010, Final Office Action mailed Dec. 20, 2013, 10 pages.
U.S. Appl. No. 12/949,287, filed Nov. 18, 2010, Final Office Action mailed Nov. 25, 2013, 25 pages.
U.S. Appl. No. 13/029,219, filed Feb. 17, 2011, Advisory Action mailed Jan. 2, 2014, 3 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/948,247, Non-Final Office Action mailed on May 21, 2014, 18 pages.
U.S. Appl. No. 12/957,697, Advisory Action mailed on May 29, 2014, 2 pages.
U.S. Appl. No. 12/957,740, Advisory Action mailed on May 23, 2014, 3 pages.
U.S. Appl. No. 13/029,226, Non-Final Office Action mailed on May 22, 2014, 12 pages.
U.S. Appl. No. 11/357,653, Final Office Action mailed on Aug. 18, 2014, 15 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 20014, 14 pages.

(56) References Cited

OTHER PUBLICATIONS

U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mailed on Sep. 8, 2014, 27 pages.
U.S. Appl. No. 13/029,219, Final Office Action mailed on Sep. 12, 2014, 24 pages.
U.S. Appl. No. 12/948,247, Final Office Action mailed on Nov. 25, 2014, 20 pages.
U.S. Appl. No. 12/957,697, Final Office Action mailed on Nov. 26, 2014, 11 pages.
U.S. Appl. No. 10/855,999, Non-Final Office Action mailed on Jun. 17, 2015, 16 pages.
U.S. Appl. No. 12/957,697, Final Office Action mailed on Jun. 18, 2015, 12 pages.
U.S. Appl. No. 13/029,226, Non-Final Office Action mailed on Jun. 19, 2015, 13 pages.
U.S. Appl. No. 12/957,740, Final Office Action mailed on Aug. 12, 2015, 26 pages.
U.S. Appl. No. 11/357,653, Notice of Allowance mailed on Sep. 11, 2015, 42 pages.
U.S. Appl. No. 12/949,183, Non-Final Office Action mailed on Sep. 16, 2015, 22 pages.
U.S. Appl. No. 11/123,468, filed May 5, Non-Final Office Action dated Jan. 30, 2015, 19 pages.
U.S. Appl. No. 12/949,287, Non-Final Office Action mailed on Sep. 18, 2015, 54 pages.
U.S. Appl. No. 12/544,484, filed Aug. 20, 2009, Final Office Action dated Dec. 26, 2014, 12 pages.
U.S. Appl. No. 12/544,484, filed Aug. 20, 2009, Advisory Action dated Mar. 10, 2015, 3 pages.
U.S. Appl. No. 11/357,653, Notice of Allowance mailed on Oct. 5, 2015, 16 pages.
U.S. Appl. No. 12/948,247, Notice of Allowance mailed on Oct. 13, 2015, 8 pages.
U.S. Appl. No. 12/957,697, Advisory Action mailed on Aug. 25, 2015, 2 pages.
U.S. Appl. No. 12/957,697, Non-Final Office Action mailed on Oct. 15, 2015, 13 pages.
U.S. Appl. No. 11/123,468, filed May 5, 2005, Final Office Action dated Apr. 8, 2016, all pages.
U.S. Appl. No. 12/949,287, filed Nov. 18, 2010, Final Office Action mailed Feb. 19, 2016, all pages.
U.S. Appl. No. 12/544,484, Non-Final Office Action mailed on Aug. 1, 2016, 10 pages.
U.S. Appl. No. 12/957,697, Notice of Allowance mailed on Jun. 15, 2016, 8 pages.
U.S. Appl. No. 12/957,740, Notice of Allowance mailed on Jul. 29, 2016, 7 pages.
U.S. Appl. No. 13/029,226, filed Feb. 17, 2011, Final Office Action mailed Jan. 4, 2016, 14 pages.
U.S. Appl. No. 12/957,740, filed Dec. 1, 2010, Non-Final Office Action mailed Jan. 7, 2016, 21 pages.
U.S. Appl. No. 12/957,697, filed Dec. 10, 2010, Final Office Action mailed Feb. 3, 2016, all pages.
U.S. Appl. No. 12/949,183, filed Nov. 18, 2010, Final Office Action mailed Feb. 8, 2016, all pages.
U.S. Appl. No. 12/014,387, dated Sep. 7, 2011, Non-Final Office Action.
U.S. Appl. No. 12/014,387, dated Apr. 5, 2012, Final Office Action.
U.S. Appl. No. 12/014,387, dated Jun. 15, 2012, Advisory Action.
U.S. Appl. No. 12/014,387, dated Oct. 25, 2013, Notice of Allowance.
U.S. Appl. No. 12/014,387, dated Dec. 18, 2013, Corrective Notice of Allowance.
U.S. Appl. No. 12/019,299, dated Dec. 9, 2010, Advisory Action.
U.S. Appl. No. 12/019,299, dated Oct. 6, 2010, Final Office Action.
U.S. Appl. No. 12/019,299, dated Mar. 31, 2010, Non-Final Office Action.
U.S. Appl. No. 12/019,299, dated Jan. 24, 2011, Non-Final Office Action.
U.S. Appl. No. 12/019,299, dated Aug. 25, 2011, Final Office Action.
U.S. Appl. No. 12/019,299, dated Nov. 3, 2011, Advisory Action.
U.S. Appl. No. 12/019,299, dated Feb. 16, 2012, Non-Final Office Action.
U.S. Appl. No. 12/019,299, dated Aug. 15, 2012, Final Office Action.
U.S. Appl. No. 12/019,299, dated Oct. 29, 2012, Advisory Action.
U.S. Appl. No. 12/019,299, dated Dec. 7, 2012, Non-Final Office Action.
U.S. Appl. No. 12/019,299, dated Jul. 3, 2013, Notice of Allowance.
U.S. Appl. No. 12/948,247, dated Jul. 6, 2012, Non-Final Office Action.
U.S. Appl. No. 12/948,247, dated Feb. 11, 2013, Final Office Action.
U.S. Appl. No. 12/948,247, dated May 21, 2014, Non-Final Office Action.
U.S. Appl. No. 12/948,450, dated Nov. 7, 2012, Non-Final Office Action.
U.S. Appl. No. 12/948,450, dated May 10, 2013, Notice of Allowance.
U.S. Appl. No. 12/949,287, dated Nov. 19, 2012, Non-Final Office Action.
U.S. Appl. No. 12/949,287, dated Apr. 23, 2013, Final Office Action.
U.S. Appl. No. 12/949,287, dated Aug. 8, 2013, Non-Final Office Action.
U.S. Appl. No. 12/949,287, dated Nov. 25, 2013, Final Office Action.
U.S. Appl. No. 12/949,287, dated Sep. 8, 2014, Non-Final Office Action.
U.S. Appl. No. 12/791,129, dated Jul. 10, 2012, Non-Final Office Action.
U.S. Appl. No. 12/791,129, dated Dec. 7, 2012, Final Office Action.
U.S. Appl. No. 12/791,129, dated Sep. 11, 2013, Non-Final Office Action.
U.S. Appl. No. 12/791,129, dated Dec. 20, 2013, Final Office Action.
U.S. Appl. No. 12/791,129, dated Mar. 6, 2014, Advisory Action.
U.S. Appl. No. 12/791,129, dated Apr. 24, 2014, Notice of Allowance.
U.S. Appl. No. 12/791,129, dated Oct. 6, 2014, Corrected Notice of Allowance.
U.S. Appl. No. 12/949,183, dated Nov. 16, 2012, Non-Final Office Action.
U.S. Appl. No. 12/949,183, dated Apr. 17, 2013, Final Office Action.
U.S. Appl. No. 12/949,183, dated Jun. 28, 2013, Advisory Action.
U.S. Appl. No. 12/949,183, dated Sep. 9, 2013, Non-Final Office Action.
U.S. Appl. No. 12/949,183, dated Jan. 21, 2014, Final Office Action.
U.S. Appl. No. 12/949,183, dated Apr. 10, 2014, Advisory Action.
U.S. Appl. No. 12/949,183, dated Sep. 22, 2014, Non-Final Office Action.
U.S. Appl. No. 12/957,697, dated Oct. 1, 2013, Non-final Office Action.
U.S. Appl. No. 12/957,697, dated Mar. 20, 2014, Non-Final Office Action.
U.S. Appl. No. 12/957,697, dated May 29, 2014, Advisory Action.
U.S. Appl. No. 12/957,697, dated Jul. 2, 2014, Non-Final Office Action.
U.S. Appl. No. 12/957,740, dated Oct. 17, 2012, Non-Final Office Action.
U.S. Appl. No. 12/957,740, dated Feb. 15, 2013, Final Office Action.
U.S. Appl. No. 12/957,740, dated May 21, 2013, Advisory Action.
U.S. Appl. No. 12/957,740, dated Aug. 15, 2013, Non-Final Office Action.
U.S. Appl. No. 12/957,740, dated Feb. 19, 2014, Final Office Action.
U.S. Appl. No. 12/957,740, dated May 23, 2014, Advisory Action.

(56) References Cited

OTHER PUBLICATIONS

U.S. Appl. No. 13/029,219, dated Mar. 20, 2013, Non-Final Office Action.
U.S. Appl. No. 13/029,219, dated Oct. 11, 2013, Final Office Action.
U.S. Appl. No. 13/029,219, dated Jan. 2, 2014, Advisory Action.
U.S. Appl. No. 13/029,219, dated Apr. 11, 2014, Non-Final Office Action.
U.S. Appl. No. 13/029,219, dated Sep. 12, 2014, Final Office Action.
U.S. Appl. No. 13/029,226, dated May 28, 2013, Non-Final Office Action.
U.S. Appl. No. 13/029,226, dated Jan. 30, 2014, Final Office Action.
U.S. Appl. No. 13/029,226, dated Apr. 7, 2014, Advisory Action.
U.S. Appl. No. 13/029,226, dated May 22, 2014, Non-Final Office Action.
U.S. Appl. No. 13/416,413, dated Apr. 27, 2012, Non-Final Office Action.
U.S. Appl. No. 13/416,413, dated Oct. 2, 2012, Notice of Allowance.
U.S. Appl. No. 10/855,999, filed May 28, 2004.
U.S. Appl. No. 11/123,468, filed May 5, 2005.
U.S. Appl. No. 12/045,220, filed Mar. 10, 2008.
U.S. Appl. No. 12/019,335, filed Jan. 24, 2008.
U.S. Appl. No. 11/357,653, filed Feb. 16, 2006.
U.S. Appl. No. 12/544,484, filed Aug. 20, 2009.
U.S. Appl. No. 11/969,343, filed Jan. 4, 2008.
U.S. Appl. No. 12/014,387, filed Jan. 15, 2008.
U.S. Appl. No. 12/019,299, filed Jan. 24, 2008.
U.S. Appl. No. 12/948,247, filed Nov. 17, 2010.
U.S. Appl. No. 12/949,287, filed Nov. 18, 2010.
U.S. Appl. No. 12/791,129, filed Jun. 1, 2010.
U.S. Appl. No. 12/949,183, filed Nov. 18, 2010.
U.S. Appl. No. 12/957,697, filed Dec. 1, 2010.
U.S. Appl. No. 13/029,219, filed Feb. 17, 2011.
U.S. Appl. No. 13/029,226, filed Feb. 17, 2011.
U.S. Appl. No. 12/957,740, filed Dec. 1, 2010.
U.S. Appl. No. 11/848,347, dated Jul. 27, 2010, Advisory Action.
U.S. Appl. No. 11/848,347, dated May 10, 2010, Final Office Action.
U.S. Appl. No. 11/848,347, dated Oct. 29, 2009, Non-Final Office Action.
U.S. Appl. No. 11/848,347, dated Sep. 30, 2010, Non-Final Office Action.
U.S. Appl. No. 11/848,347, dated Mar. 7, 2011, Final Office Action.
U.S. Appl. No. 11/848,347, dated May 23, 2011, Advisory Action.
U.S. Appl. No. 11/848,347, dated Mar. 2, 2012, Notice of Allowance.
U.S. Appl. No. 11/877,129, dated Jun. 3, 2010, Advisory Action.
U.S. Appl. No. 11/877,129, dated Mar. 29, 2010, Final Office Action.
U.S. Appl. No. 11/877,129, dated Aug. 5, 2010, Notice of Allowance.
U.S. Appl. No. 11/877,129, dated Sep. 28, 2009, Non-Final Office Action.
U.S. Appl. No. 11/926,738, dated Jun. 29, 2010, Final Office Action.
U.S. Appl. No. 11/926,738, dated Feb. 24, 2010, Non-Final Office Action.
U.S. Appl. No. 11/926,738, dated Sep. 3, 2010, Advisory Action.
U.S. Appl. No. 11/926,738, dated Nov. 10, 2010, Non-Final Office Action.
U.S. Appl. No. 11/926,738, dated Mar. 17, 2011, Final Office Action.
U.S. Appl. No. 11/926,738, dated May 25, 2011, Advisory Action.
U.S. Appl. No. 11/926,738, dated Aug. 5, 2011, Notice of Allowance.
U.S. Appl. No. 11/943,101, dated Feb. 2, 2010, Final Office Action.
U.S. Appl. No. 11/943,101, dated Jul. 8, 2009, Non-Final Office Action.
U.S. Appl. No. 11/943,101, dated Apr. 16, 2010, Advisory Action.
U.S. Appl. No. 11/943,101, dated Aug. 27, 2010, Non-Final Office Action.
U.S. Appl. No. 11/943,101, dated Feb. 14, 2011, Final Office Action.
U.S. Appl. No. 11/943,101, dated Apr. 28, 2011, Advisory Action.
U.S. Appl. No. 11/943,101, dated Jul. 28, 2011, Non-Final Office Action.
U.S. Appl. No. 11/943,101, dated Dec. 9, 2011, Notice of Allowance.
U.S. Appl. No. 11/951,500, dated Jun. 24, 2010, Advisory Action.
U.S. Appl. No. 11/951,500, dated Mar. 30, 2010, Final Office Action.
U.S. Appl. No. 11/951,500, dated Sep. 22, 2009, Non-Final Office Action.
U.S. Appl. No. 11/951,500, dated Sep. 1, 2010, Non-Final Office Action.
U.S. Appl. No. 11/951,500, dated Apr. 14, 2011, Final Office Action.
U.S. Appl. No. 11/951,500, dated Jul. 15, 2011, Advisory Action.
U.S. Appl. No. 11/951,500, dated Apr. 11, 2012, Non-Final Office Action.
U.S. Appl. No. 11/951,500, dated Jul. 23, 2012, Notice of Allowance.
U.S. Appl. No. 10/855,999, dated Nov. 18, 2013, Final Office Action.
U.S. Appl. No. 10/855,999, dated Mar. 28, 2013, Non-Final Office Action.
U.S. Appl. No. 10/855,999, dated Mar. 18, 2011, Advisory Action.
U.S. Appl. No. 10/855,999, dated Feb. 16, 2010, Advisory Action.
U.S. Appl. No. 10/855,999, dated Feb. 2, 2009, Advisory Action.
U.S. Appl. No. 10/855,999, dated Nov. 19, 2008, Final Office Action.
U.S. Appl. No. 10/855,999, dated Nov. 23, 2009, Final Office Action.
U.S. Appl. No. 10/855,999, dated Apr. 15, 2009, Non-Final Office Action.
U.S. Appl. No. 10/855,999, dated May 1, 2008, Non-Final Office Action.
U.S. Appl. No. 10/855,999, dated Jun. 24, 2010, Non-Final Office Action.
U.S. Appl. No. 10/855,999, dated Jan. 5, 2011, Final Office Action.
U.S. Appl. No. 10/856,588, dated Jan. 5, 2010, Advisory Action.
U.S. Appl. No. 10/856,588, dated Oct. 15, 2008, Final Office Action.
U.S. Appl. No. 10/856,588, dated Oct. 20, 2009, Final Office Action.
U.S. Appl. No. 10/856,588, dated Sep. 23, 2010, Notice of Allowance.
U.S. Appl. No. 10/856,588, dated Mar. 16, 2009, Non-Final Office Action.
U.S. Appl. No. 10/856,588, dated Apr. 11, 2008, Non-Final Office Action.
U.S. Appl. No. 11/070,317, dated Oct. 19, 2012, Notice of Allowance.
U.S. Appl. No. 11/070,317, dated Sep. 4, 2012, Notice of Allowance.
U.S. Appl. No. 11/070,317, dated Mar. 15, 2012, Non-Final Office Action.
U.S. Appl. No. 11/070,317, dated Sep. 27, 2010, Final Office Action.
U.S. Appl. No. 11/070,317, dated Apr. 30, 2010, Non-Final Office Action.
U.S. Appl. No. 11/070,317, dated Feb. 2, 2010, Final Office Action.
U.S. Appl. No. 11/070,317, dated Aug. 18, 2009, Non-Final Office Action.
U.S. Appl. No. 11/070,317, dated May 19, 2009, Advisory Action.
U.S. Appl. No. 11/070,317, dated Mar. 4, 2009, Final Office Action.
U.S. Appl. No. 11/070,317, dated Aug. 5, 2008, Non-Final Office Action.
U.S. Appl. No. 11/024,160, dated Feb. 7, 2011, Non-Final Office Action.
U.S. Appl. No. 11/024,160, dated Feb. 18, 2010, Advisory Action.
U.S. Appl. No. 11/024,160, dated Oct. 15, 2010, Final Office Action.
U.S. Appl. No. 11/024,160, dated Dec. 3, 2009, Final Office Action.
U.S. Appl. No. 11/024,160, dated Feb. 11, 2009, Final Office Action.
U.S. Appl. No. 11/024,160, dated Jun. 29, 2009, Non-Final Office Action.

(56) References Cited

OTHER PUBLICATIONS

U.S. Appl. No. 11/024,160, dated Jun. 9, 2010, Non-Final Office Action.
U.S. Appl. No. 11/024,160, dated Aug. 22, 2008, Non-Final Office Action.
U.S. Appl. No. 11/024,160, dated Jun. 1, 2011, Final Office Action.
U.S. Appl. No. 11/024,160, dated Aug. 4, 2011, Notice of Allowance.
U.S. Appl. No. 11/123,468, dated Feb. 17, 2010, Advisory Action.
U.S. Appl. No. 11/123,468, dated Nov. 10, 2010, Final Office Action.
U.S. Appl. No. 11/123,468, dated Nov. 24, 2009, Final Office Action.
U.S. Appl. No. 11/123,468, dated Apr. 10, 2009, Non-Final Office Action.
U.S. Appl. No. 11/123,468, dated Apr. 14, 2010, Non-Final Office Action.
U.S. Appl. No. 11/123,468, dated Jan. 18, 2011, Advisory Action.
U.S. Appl. No. 11/123,468, dated Jun. 10, 2014, Non-Final Office Action.
U.S. Appl. No. 11/123,471, dated Jun. 29, 2009, Notice of Allowance.
U.S. Appl. No. 11/123,471, dated Jan. 23, 2009, Non-Final Office Action.
U.S. Appl. No. 11/130,636, dated Aug. 18, 2010, Notice of Allowance.
U.S. Appl. No. 11/130,636, dated Mar. 23, 2010, Non-Final Office Action.
U.S. Appl. No. 11/130,636, dated Sep. 18, 2009, Non-Final Office Action.
U.S. Appl. No. 11/939,705, dated Oct. 4, 2010, Non-Final Office Action.
U.S. Appl. No. 11/939,705, dated Mar. 16, 2011, Final Office Action.
U.S. Appl. No. 11/939,705, dated Sep. 28, 2011, Non-Final Office Action.
U.S. Appl. No. 11/939,705, dated Mar. 15, 2012, Final Office Action.
U.S. Appl. No. 11/939,705, dated Jun. 1, 2012, Advisory Action.
U.S. Appl. No. 11/939,705, dated Jul. 6, 2012, Non-Final Office Action.
U.S. Appl. No. 11/939,705, dated Dec. 5, 2012, Final Office Action.
U.S. Appl. No. 11/939,705, dated May 15, 2013, Notice of Allowance.
U.S. Appl. No. 12/045,220, dated Oct. 7, 2013, Non-Final Office Action.
U.S. Appl. No. 12/045,220, dated May 31, 2012, Advisory Action.
U.S. Appl. No. 12/045,220, dated Mar. 15, 2012, Final Office Action.
U.S. Appl. No. 12/045,220, dated Sep. 27, 2011, Non-Final Office Action.
U.S. Appl. No. 12/045,220, dated Jun. 11, 2010, Advisory Action.
U.S. Appl. No. 12/045,220, dated Apr. 2, 2010, Final Office Action.
U.S. Appl. No. 12/045,220, dated Oct. 2, 2009, Non-Final Office Action.
U.S. Appl. No. 12/045,220, dated Apr. 18, 2014, Final Office Action.
U.S. Appl. No. 12/045,220, dated Aug. 13, 2014, Notice of Allowance.
U.S. Appl. No. 12/019,335, dated May 23, 2011, Non-Final Office Action.
U.S. Appl. No. 12/019,335, dated Dec. 5, 2011, Final Office Action.
U.S. Appl. No. 12/019,335, dated Feb. 27, 2012, Advisory Action.
U.S. Appl. No. 12/019,335, dated Jan. 14, 2014, Final Office Action.
U.S. Appl. No. 12/019,335, dated Jul. 26, 2013, Non-Final Office Action.
U.S. Appl. No. 12/019,335, dated Jun. 11, 2014, Notice of Allowance.
U.S. Appl. No. 12/364,642, dated Dec. 20, 2010, Non-Final Office Action.
U.S. Appl. No. 12/364,642, dated Jul. 1, 2011, Final Office Action.
U.S. Appl. No. 12/364,642, dated Sep. 16, 2011, Advisory Action.
U.S. Appl. No. 12/364,642, dated Oct. 18, 2011, Non-Final Office Action.
U.S. Appl. No. 12/364,642, dated Jun. 19, 2012, Final Office Action.
U.S. Appl. No. 12/364,642, dated Sep. 14, 2012, Advisory Action.
U.S. Appl. No. 12/364,642, dated Nov. 14, 2012, Notice of Allowance.
U.S. Appl. No. 11/357,653, dated Jan. 20, 2011, Non-Final Office Action.
U.S. Appl. No. 11/357,653, dated Aug. 2, 2011, Final Office Action.
U.S. Appl. No. 11/357,653, dated Oct. 12, 2011, Advisory Action.
U.S. Appl. No. 11/357,653, dated Apr. 26, 2012, Non-Final Office Action.
U.S. Appl. No. 11/357,653, dated Sep. 21, 2012, Final Office Action.
U.S. Appl. No. 11/357,653, dated Dec. 4, 2012, Advisory Action.
U.S. Appl. No. 11/357,653, dated Jul. 11, 2013, Non-Final Office Action.
U.S. Appl. No. 11/357,653, dated Nov. 26, 2013, Final Office Action.
U.S. Appl. No. 11/357,653, dated Mar. 27, 2014, Non-Final Office Action.
U.S. Appl. No. 11/357,653, dated Aug. 18, 2014, Final Office Action.
U.S. Appl. No. 12/544,459, dated Mar. 2, 2011, Non-Final Office Action.
U.S. Appl. No. 12/544,459, dated Aug. 22, 2011, Notice of Allowance.
U.S. Appl. No. 12/544,471, dated Jan. 6, 2012, Non-Final Office Action.
U.S. Appl. No. 12/544,471, dated Jul. 30, 2012, Final Office Action.
U.S. Appl. No. 12/544,471, dated Nov. 9, 2012, Advisory Action.
U.S. Appl. No. 12/544,471, dated Mar. 12, 2013, Notice of Allowance.
U.S. Appl. No. 12/544,484, dated Feb. 9, 2012, Advisory Action.
U.S. Appl. No. 12/544,484, dated Jun. 3, 2011, Non-Final Office Action.
U.S. Appl. No. 12/544,484, dated Dec. 1, 2011, Final Office Action.
U.S. Appl. No. 12/544,484, dated May 8, 2014, Non-Final Office Action.
U.S. Appl. No. 12/544,484, dated Aug. 1, 2014, Non-Final Office Action.
U.S. Appl. No. 12/490,540, dated Jul. 6, 2012, Non-Final Office Action.
U.S. Appl. No. 12/490,540, dated Feb. 4, 2013, Notice of Allowance.
U.S. Appl. No. 11/949,930, dated Sep. 29, 2011, Non-Final Office Action.
U.S. Appl. No. 11/949,930, dated Mar. 19, 2012, Notice of Allowance.
U.S. Appl. No. 11/969,343, dated Jun. 10, 2011, Non-Final Office Action.
U.S. Appl. No. 11/969,343, dated Oct. 21, 2011, Final Office Action.
U.S. Appl. No. 11/969,343, dated Jan. 5, 2012, Advisory Action.
U.S. Appl. No. 11/969,343, dated Jan. 16, 2014, Notice of Allowance.
U.S. Appl. No. 11/969,343, dated Apr. 9, 2014, Notice of Allowance.
U.S. Appl. No. 12/948,247, dated Nov. 25, 2014, Final Office Action.
U.S. Appl. No. 12/957,697, dated Nov. 26, 2014, Final Office Action.

* cited by examiner

SERVICE ORIENTED ARCHITECTURE-BASED SCIM PLATFORM

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the processing and routing of messages and information in a computer network. In particular, various embodiments relate to dynamic processing and/or routing of messages using a service-oriented architecture.

As computer networks become evermore complex, and are further extended to include functionality for wireless and mobile devices, there is an increasing need to orchestrate interaction between the capabilities of the various components across the network. A network architecture such as IMS (IP Multimedia Subsystem), for example, can be used for networks where mobile capabilities are needed. IMS is an IP-based architecture that utilizes protocols such as SIP (Session Initiation Protocol) to provide necessary support for mobile deployment. SIP is a signaling protocol typically used for mobile applications and services such as messaging, presence detection and reporting, and telephony. SIP can be used to connect the mobile device or other client with the appropriate network server(s).

Recently the Service Capability Interaction Manager (SCIM) was introduced (by the Third Generation Partnership Project, or "3GPP") as a functional architecture for the provision of services in IMS as a function within an SIP application server domain of the IMS architecture, and was subsequently endorsed by many other IMS activities in other industry forums. A SCIM typically is used to orchestrate the delivery of services among application server platforms in the IMS architecture. A SCIM component can be programmed or configured to dictate the sequence of services used to process a event such as an incoming SIP call, such as may be needed to bar or forward the call, or associate to other processing of the call.

The original specification of the SCIM functionality (e.g., in 3GPP R6) is essentially a preview of the kind of functionality a SCIM can provide without any real detail. As IMS networks proliferate, and capabilities on IMS networks proliferate, the challenge of managing the composition and orchestration of core capabilities becomes increasingly important. Solving this challenge is at the heart of the SCIM functionality.

Currently, many vendors are attempting to design and incorporate complex mechanisms to provide SCIM as a specific network function. These SCIM solutions basically fall into one of three general approaches. In one such approach, SCIM is implemented using an S-CSCF (Serving Call Session Control Function) component that is defined as part of the IMS. The S-CSCF component functions like an extended edge proxy server of the IMS, such that when an incoming SIP message is received, the message is routed directly to the appropriate application based on the message and the relevant SCIM information.

In a second approach, SCIM is built as a separate network component that performs this functionality. An S-CSCF is still used according to the IMS model and plays the role of an edge proxy server, but in this approach the S-CSCF component receives the incoming SIP message and systematically passes the message to the SCIM component. The SCIM component then examines the relevant SCIM information and sends the message to the appropriate application for processing.

A third approach utilizes a dedicated SIP application server, wherein an S-CSCF component receiving a message passes the message directly to the SIP application server. The SIP application server contains the logic or instructions necessary to determine the appropriate application or servlet to process the message and can route or process the message as needed.

There are limitations to such approaches, however, as these approaches are all implemented substantially at the network level or session level. There is only a certain amount of information available at the network or session level, which results in limitations on the functionality that can be provided.

BRIEF SUMMARY OF THE INVENTION

Systems and methods in accordance with various embodiments of the present invention can overcome these and other deficiencies in existing message processing systems.

In one embodiment a system for controlling signaling, and any media with the signaling, using service level logic includes a network interface component operable to receive a signaling message or event, such as a Session Initiation Protocol (SIP) request, from a network layer, such as a layer based on an IP Multimedia Subsystem (IMS) architecture. A messaging event in one embodiment always comes from the session layer in a network that separates session from transport/media exchanges (e.g., SIP, IMS) or from the network layer when/where that separation does not exist (e.g., PSTN, IN). The corresponding event can be passed via an enabler, SIP servlet, or Parlay, for example, to the service layer. These can be, for example, Java objects or interfaces or Web services. The events then are in the service layer or SOA layer where the SOA SCIM discussed elsewhere herein will apply to process the event and decide what to do, possibly triggering other workflows, such as may be explained by policies (any combination of condition(s) and action(s)). A plurality of applications, which may reside in a service level container such as SIP, OSA AS, J2EE, HTTP AS, or SDP that converges these capabilities, are each programmed to perform at least one service for the signaling message/event or information (such as media) to process the event. A signaling message/event processing component is used that is programmed to apply service level logic and any environmental and contextual information at the service layer to the signaling message in order to direct or otherwise process the signaling message/event or information relating thereto. For example, the processing component can direct processing of the signaling message/event to one of the determined applications as specified in the routing policies (any combination of any condition and any action) in order to process the signaling message/event. The determination of the application to which to direct the message can further be based on other information, such as load balancing information. After the determined application processes the signaling message/event or related information, the message processing component can further direct the signaling message/event (which can control a multimedia session, for example) to at least one other application based at least in part on the policy in vigor or determined as associated to processing of the specific signaling message/event and/or as a processing result of the determined application. In some instances, the signaling message/event can include multimedia message information.

The applying of service level logic can include the applying of at least one policy, which can include any combination of conditions and actions. Applying a policy can include functions such as performing queries to the environmental and contextual information and composing service level code (i.e., making service level/SOA calls to other functions, enablers or applications). The signaling message/event processing component can include one of a network protocol routing component, a signaling message/event dispatching component, and a session initiation protocol (SIP) servlet composition in SIP application services (SIP AS). The signaling message/event processing component also can consist of a hard coded set of processing steps/policies or of a composition of enablers, or application components that may be using enablers. The enablers can include a media control enabler, voice access (dialog management) enabler and/or a call control enabler and many others like messaging, charging, etc. The signaling message/event processing component also can utilize at least one workflow to assist in processing the signaling message/event. The signaling message/event processing component also can involve calling/passing the signaling message/event to a conventional implementation of Service Capability Interaction Manager (SCIM)-based component operable to dictate a sequence of services used to process the message in the IMS architecture.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 5 illustrates a steps of an exemplary method that can be used in accordance with one embodiment of the present invention;

DETAILED DESCRIPTION OF THE INVENTION

Figure 1A:
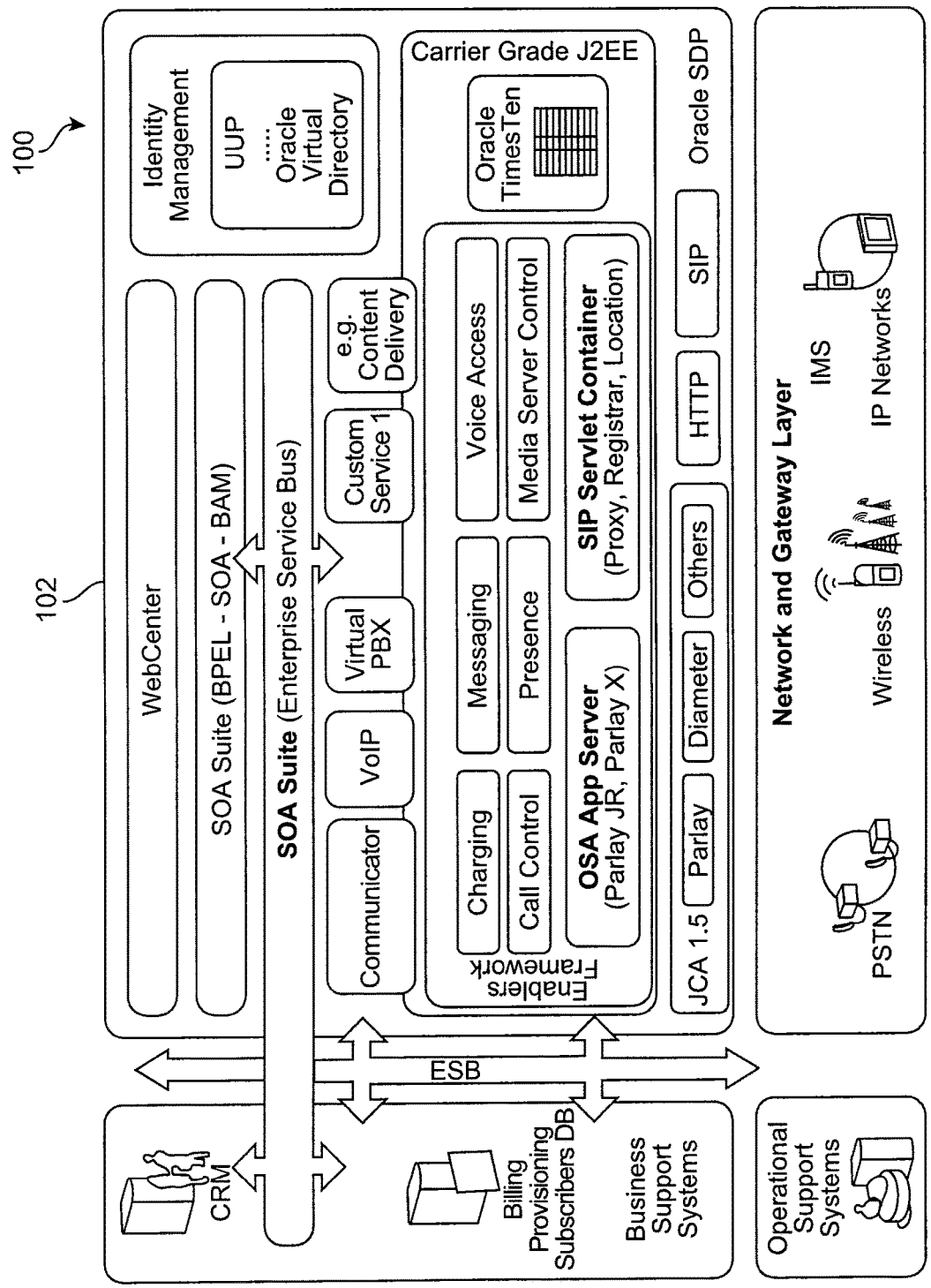
FIGS. 1(a) and 1(b) illustrate a service delivery platform-based architecture that can be used with various embodiments of the present invention.

Systems and methods in accordance with various embodiments can overcome the aforementioned and other deficiencies in existing SCIM-based and other routing approaches by providing dynamic processing and routing capability at the service level. Thorough and effective processing of SIP messages, for example, requires contextual service information that is not available at the network and/or session levels. In order to dynamically determine a proper sequence to process a SIP message, it is beneficial to examine contextual information at the service level such as information about the execution of the service(s) for the message, the context at the level of the service, information available to a service from other components and/or services, and results of previous services executed against a message. If a processing sequence is determined at the network level, as in the prior approaches discussed above, such extra contextual information and the status or impact of past services is not available, and thus the approach is necessarily more restricted.

Such approaches can provide for SCIM functionality using a service delivery platform (SDP). Other approaches, such as in S-CSCF, in-network, or limited to SIP AS, lack service level context and composition with other enablers. The various approaches can have different performance trade-offs that can be balanced based on factors such as a usage model and the needs of the respective service provider. Service level SCIM can interoperate with conventional network level SCIM, such as where one passes control to the other. Control can go back and forth, where the network SCIM assumes the service level SCIM to be an application/SIP AS and, conversely, the service level SCIM assumes it passes to another application by returning to the network level SCIM. Service level intrinsic SCIM functionality can be provided as an application routing on the signaling message/event; a SIP servlet composition (for SIP only); a SOA composition of enablers, application building blocks or applications; or an application dispatching in the service layer, such as is described in co-pending U.S. patent application Ser. No. 11/969,343, filed Jan. 4, 2008, entitled "Abstract Application Dispatcher on Call Control Enabler," which is hereby incorporated herein by reference.

There can be several layers in such an approach, which may include a network level SCIM, in network level/S-CSCF, in SIP AS or programmable S-CSCF, and in service layer. In other/conventional SCIM approaches there are network level SCIM, including in S-CSCF or in Network (pre-programmed), which is SIP/IMS specific, and is limited to SIP AS (edge Session/service layer), programmable S-CSCF via SIP AS. These approaches lack service level context/composition with other enablers but may be "faster." There may be a trade-off in performance to be balanced, such as may be based on usage model and needs of the service provider.

In one embodiment, a SDP (service level) includes service level intrinsic SCIM functions that can be provided as application routing on the signaling message/event, such as using SIP AS to program, possibly based on context, etc., the routing for applications and/or the service layer instead of routing in advance in S-CSCF or Network via routes that have been a priori provisioning. Another example includes SIP servlet composition for SIP only, (e.g. JSR 289, SIP application code), as well as SOA composition of enablers, application building blocks or applications (e.g. BPEL composition of servlet, BPEL or java composition of call control enabler, SIP/messaging composition for SIP/SMS in/out, etc.). Still another example includes application dispatching in the service layer (e.g., routing done by call control enabler driven by application logic—this is on SIP NWs or legacy/non SIP networks).

Service level SCIM can interoperate with network level SCIM. In general, decisions are pre-provisioned in network/S-CSCF, programmable but disconnected from application context at the edge SIP AS based S-CSCF, but in at least one embodiment is based on any service level context/logic in the service layer and extended to composition with any other service level capabilities (e.g. based on presence or composing messaging, voice access, media server control, charging, etc.).

Systems and methods in accordance with various embodiments described herein implement SCIM-type functionality at the service layer. Using SCIM at the service layer allows the system to behave like a service-oriented architecture (SOA) for SCIM. This implementation also can be done, however, as part of a service-oriented architecture (SOA), whereby processing of a signaling message/event occurs as an orchestration and composition of services at the service layer. An SOA typically orchestrates loosely coupled services and provides an environment wherein resources are made available as independent but readily accessible services. An SOA-based SCIM approach is implemented at three levels in one embodiment, wherein the SIP server is not an isolated component but part of a converged service delivery platform (SDP), or a horizontal platform that covers the service layer. Various aspects of an SDP are described, for example, in co-pending U.S. patent application Ser. No. 11/357,653, entitled "Factorization of Concerns to Build a SDP (Service Delivery Platform)," filed Feb. 16, 2006, which is hereby incorporated herein by reference. Aspects of an application dispatcher component are described, for example, in co-pending U.S. patent application Ser. No. 11/969,343, entitled "Abstract Application Dispatcher on Call Control Enabler," filed Jan. 4, 2008, which is incorporated by reference above.

It should be noted that various SOA-based SCIM approaches that will be discussed herein do not necessarily require or utilize an explicit application, infrastructure, or component called SOA SCIM, SOA-based SCIM, or anything similar. SOA-based SCIM instead results form a system or approach that allows for signaling messages and/or events to be passed to the service layer via protocol-specific adapters or enablers, such as a call control enabler discussed elsewhere herein, which can then be passed to a service level application or element that can execute logic to process the signaling message/event. One result in particular is a combination with calls to other applications, or a passing of the processing request to other applications. Such an approach implements SOA-based SCIM functionality even where there is no explicit component designed to do so.

In the context of an SDP, composition can be achieved using composition servlets without exiting the SIP servlet container (i.e., sharing SIP session/application session context)s. In other words, servlets can be written that indicates the existence of a second servlet in addition to a first servlet, and can process (on or in reaction to signaling messages/events) the second and/or subsequent servlets based on the processing of the first servlet. Composition can also allow for a configuration such that after executing a servlet, another servlet kicks in based on a composition script provided with the servlets. In one embodiment, servlet composition is done within the application server using a converged container with the SDP, whereby the system can rely on other information present in the container. The system thus is not in a silo-based type of isolation at the network level as in previous approaches.

This happens in one respect because there is a converged container defined by the fact that all components in the container, such as HTTP, SIP, J2EE elements such as like enablers, OSA AS, etc., can interact with each others. As discussed above, an SDP is a horizontal platform for the service layer that abstracts underlying network resources via enablers, is standards based, follows SOA (i.e., factoring out business rules and providing mobile voice and communication features via enablers), and realizes OSE. Further, with a converged SIP AS and OSA AS within an IT platform and telephony AS, all objects can interact with each other and in at least one case telephony AS includes a set of telephony functions as widgets.

In an example utilizing SIP, such a system can provide for application dispatching/routing via a routing table/header at the SIP protocol level, for example, and for application dispatching using what shall be referred to herein as an application dispatcher. An application dispatcher provides for a policy-based approach to processing items such as SIP messages and other signaling messages/events, and acts independently of the protocol/network technology but rather acts at the service layer (e.g., by using the call control enabler) to provide similar functionality as further described in the "Abstract Application Dispatcher on Call Control Enabler" application incorporated by reference above. As set forth in that description, SOA-based SCIM embodiments do not require the use of a call control enbaler or other enabler. As discussed elsewhere herein, the implementation can be done directly in SIP servlets, in Parlay, or against APIs/protocols supported by the underlying network, for example. The use of a call control enabler simply illustrates one approach to implementing SOA-based SCIM, and is not required even for such an embodiment.

The present description references the co-pending application dispatcher application referenced above since an application dispatcher is an example of a way to implement SOA-based SCIM functionality. Processing of the signaling message/events amounts in such a case to dispatching from application to application based on policies set in advanced or based on dynamic interactions through the dispatcher northbound interface. Using an application dispatcher to implement the SOA SCIM is, however, just one way to proceed/implement SOA SCIM. An application dispatcher typically is a pre-built application to allow requesting to do any dispatching on any signaling message/event by providing the route policies. For example, one can also build an ad hoc application that performs processing of the signaling message/event as part of its own logic. The former is an example of an application dispatcher built for that purpose, while the second one is another example of an SOA composition of application components in reaction to the signaling message/event. An application dispatcher sequences the application of services that will be applied to such a signaling message/event, and can do this sequencing in a dynamic fashion. An application dispatcher, which in one embodiment can be treated as an application running on the SIP service container, is able to modify the routing of the message to the appropriate service based at least in part upon the result(s) of previous processing by at least one previous service or application. The application dispatcher in one embodiment is an application in the SIP service container that provides functionality that is essentially equivalent to S-CSCF, but which is dynamically programmable based on the information in the service layer (e.g. application context).

The case of application router, furthermore illustrates how SOA SCIM does not imply the need of S-CSCF to achieve the S-CSCF or conventional SCIM functionalities, and thus does not require IMS. For example, it can be accomplished over a vanilla IETF SIP network. When an application dispatcher receives an incoming SIP servlet or SIP message, the dispatcher examines the information describing how to process the message. The dispatcher then routes the message accordingly, such as sequentially or in parallel to one or multiple targets such as a SIP service. Because the Service level SCIM can be implemented on a call control enabler or an application dispatcher in certain examples, although various other implementation approaches are discussed elsewhere herein, SCIM functions can be provided on any network, not just IMS or SIP. A description of such a call control enabler can be found, for example, in U.S. patent application Ser. No. 11/949,930, filed Dec. 4, 2007, entitled "Call Control Enabler Abstracted from Underlying Network Technologies," and U.S. patent application Ser. No. 11/877,129, filed Oct. 23, 2007, entitled "Network Agnostic Media Control Enabler," each of which is hereby incorporated herein by reference. The use of a call control enabler or an implementation based on an application dispatcher, for example, demonstrate how embodiments can extend to non-SIP networks.

Figure 1B:
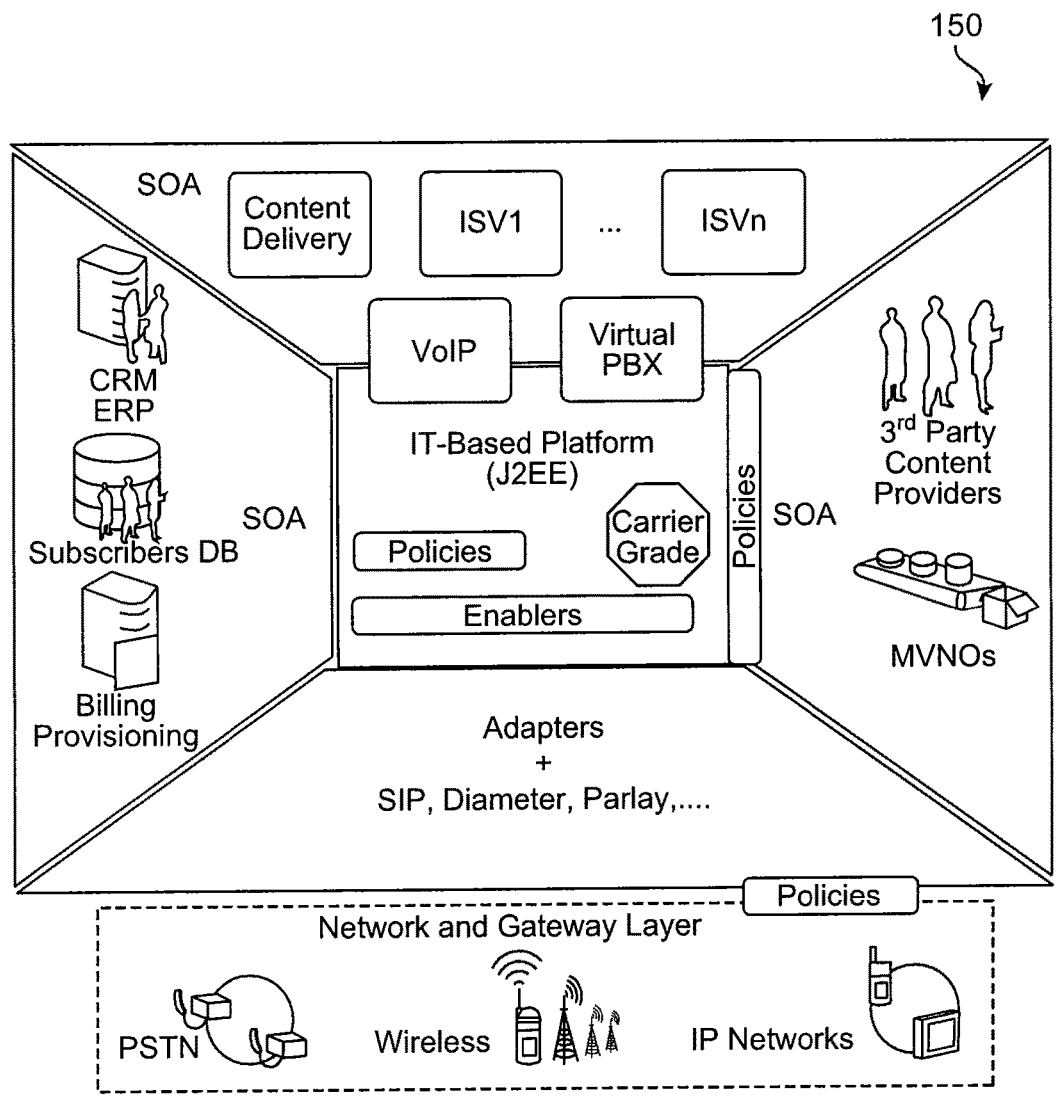

In one embodiment, a system takes advantage of a service delivery platform (SDP)-based architecture 100, such as is illustrated in FIGS. 1(*a*) and 1(*b*). In the exemplary architecture 100 of FIG. 1(*a*), the SDP 102 includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

In FIG. 1(*b*), the SDP configuration 150 implements the desired functionality on top of an underlying J2EE core provided by the application server. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

The SDP can be thought of as a service layer solution that can be deployed on Oracle Fusion® middleware/OC4J as well as JBOSS®, BEA Weblogic®, and IBM Websphere®, for example. While SIP is described as a first class citizen protocol besides HTTP, other protocols can be supported out of the box using a recipe for JCA 1.5 adapters to Parlay CORBA, Diameter, Messaging protocols etc. The J2EE® container is converged (i.e. every object from SIP, HTTP, J2EE® object etc. can share context and interact with each others, when it makes sense) and carrier grade (details provided after). This includes the use of TimesTen and open source technologies like JGroups, and also can be able to rely on Tangosol Coherence$^{TM}$ to provide session replication and efficient distributed cache. The enabler framework includes an OSA AS (i.e. Parlay JR 5.1 J2EE® local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container also can include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. It is an out of the box IMS presence server and SIP/SIMPLE presence server. It can also aggregate presence from other networks (e.g. Parlay network presence) and provide northbound parlay X interface for application to use presence without participating to the presence network. Location data can be modeled as a presence attribute using an extensible presence data model. A multichannel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that exposes online, offline charging balance inquiry and tracking, pre-rated charging etc integrated to Ro/Rf (AAA media gateways), Parlay and Oracle BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

Figure 2:
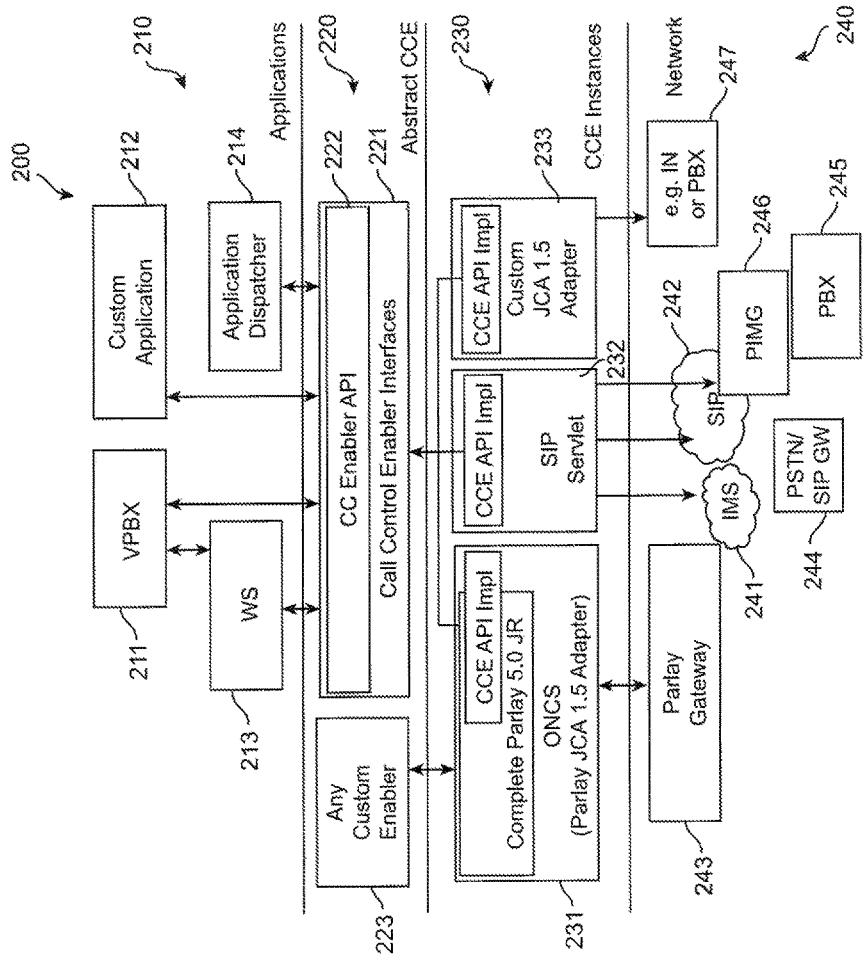
FIG. 2 illustrates a an architecture including a application dispatcher that can be used in accordance with one embodiment of the present invention.

FIG. 2 illustrates details of an example architecture 200 in accordance with one embodiments that includes a call control enabler with which an application dispatcher may be implemented according to one embodiment of the present invention. It should be noted however, that use of an application dispatcher is not necessary and SOA-based SCIM functionality can be provided using only the call control enabler. In an example with an application dispatcher, when a signaling message/event arrives, the message/event is passed via the adapter to the application layer where it results in a call notification/event that can be used to trigger any application logic in the service layer (registered to that event). That logic can involve any call to any resource/code, processing operations, composition etc. These may in particular involve requests through the call control enabler that direct the processing of the signaling message/event to other application—thereby realizing a SOA SCIM solution.

In this example, the implementation of the call controller is divided into a number of logical layers including, but not limited to, a layer of applications 210, such as an application layer or service layer, a layer comprising one or more abstract call control enablers 220, a layer comprising specific call control enabler instances 230 or implementations, and a network layer 240. Generally speaking, the application or service layer 210 can comprise any of a number of specific applications that may interface and/or interact with the call control enablers 220 and 230. For example, the applications can include, but are not limited to, a web service 213, a Virtual Public Branch eXchange (VPBX) applications 211, any number of custom applications 212, an application dispatcher 214, etc., as well as any other application that may be built to provide telephony control features that can for example be built on the call control enabler (and other enablers) and composed into things like PBX, residential VoIP etc.

The abstract call control enabler layer 220 can include, but is not limited to, any of a number of custom enablers 223 and one or more call control enabler interfaces 221. Generally speaking, the call control enabler interfaces 221 can provide high-level Application Program Interfaces (APIs) 222. Via the APIs 222, applications 210 and/or the application dispatcher 214 can call or invoke various functions or features of the call control enabler. For example, the APIs 222 provided by the abstract call control enabler layer 220 can include, but are not limited to, APIs for call creation, call forwarding and/or redirection, call handling and conferencing, call notifications, etc. Upon invocation by an application 210 or application dispatcher 214 via the API 222, one or more instances of the call control enabler may be instantiated. That is, one or more call control enabler instances can be created for specific call control enabler implementations based on the request from the applications 210 or application dispatcher 214 via the API 222.

The individual call control enabler instances 230 can be implemented in many ways to perform various functions and provide adapters to network resources. For example, the call control enabler instances 230 can include instances 231 for interfacing or adapting to Parlay-based resources. Such instances can provide, for example, Java J2EE Connector Architecture (JCA1.5) adapters to a Parlay gateway (GW) 243 JCA adapters to IN GW or PBX 247, and/or JCA adapter 233 to anything else that does call control/routing. In another example, the call control enabler instances 230 can include a Session Initiation Protocol (SIP) servlet providing an interface to IP Multimedia Subsystem (IMS) 241, SIP internet, or other SIP deployments. In such cases, SIP may be driving a PBX-IP Media Gateway (PIMG) 246 to drive PBXs 245, a SIP to PSTN GW 244, or others connected with a SIP network 242.

Thus, the northbound interface 221 of the call control enabler 200 can provide an abstract interface for invoking one or more of a plurality of call control functions. For example, the one or more call control functions can comprise establishing a connection with a second network resource such as the various services or components as described above. Establishing the connection with the second network resource can be performed via a call control function, e.g., third-party call control multi-party call control, etc., of a first network resource such as the IN GW, Parlay gateway 243, SIP GW 244, (IP)-PBX 245, PIMG 246, TAPI GW, JTAPI GW, etc.

Therefore, in use, the call control enabler 200 can be adapted to receive a request to perform a call control function from the application dispatcher 214 via the northbound interface 222 and request the call control function of the service via the appropriate southbound interface or adapter 231-233. Requesting the selected services can comprise, for example sending an invitation to join the session or otherwise initiate communication with the other parties to the communication. According to one embodiment, the invitation or other message may include an indication of the services to be performed, the parties to be involved, and/or other criteria. In some cases, the call control enabler 200 can be further adapted to receive results of the call control function from the service via the southbound interface or adapter 231-233 and return the results to the application dispatcher 214 via the northbound interface 222. Based on the returned results, the application dispatcher 214 may then select and invoke additional services.

As discussed above, the service delivery platform can in one embodiment include an application dispatcher in a service level container that provides similar functionality to S-CSCF, but which is dynamically programmable based on the information in the service layer. An SOA-based SCIM approach, however, can provide a significant amount more functionality than a conventional S-CSCF and other x-CSCE of IMS. Indeed, access to application context and invocation of other applications/enabler and composition at that lever1 are major extensions to what can be done with x-CSCF, which can only perform composition at the network level, i.e., route the processing of the signaling (SIP) message/event to the server or end point that will next interact with the message/event based on pre-loaded rules such as a proxy or location in an IETF vanilla SIP network. Such a dispatcher can have multiple modes of operation, such as is described in more detail in co-pending U.S. patent application Ser. No. 11/969,343, filed Jan. 4, 2008, entitled "Abstract Application Dispatcher on Call Control Enabler," which is incorporated by reference above. For example, FIG. 3(*a*) illustrates a standard mode of operation 300 in accordance with one embodiment. An application dispatcher or application router function can be programmed by applications or policies to perform operations such as SCIM tasks. The dispatcher can be part of a service level intrinsic function provided as application dispatching on the signaling message/event, as can be SIP servlet composition for SIP messages, and SOA composition of enablers, application building blocks, or applications as well as any other application logic that performs call control functions.

In a SIP example taking advantage of an application router, the router can be a SIP application router, or it can provide for application orchestration and is able to route incoming requests to a specific J2EE application, for example, leveraging the SIP message RouteHeader field, which can include a list of URI's to process the message. As shown in the figure, when a SIP request 302 is received, the application router 304 analyzes the Route Header to extract the URI's, then calls the first application 306 corresponding to the first URI in the header. The first application 306 calls the second application 308, which in turn calls the third application 310 to process the message, so that the processing occurs one application after the other with no modification.

Figure 3A:
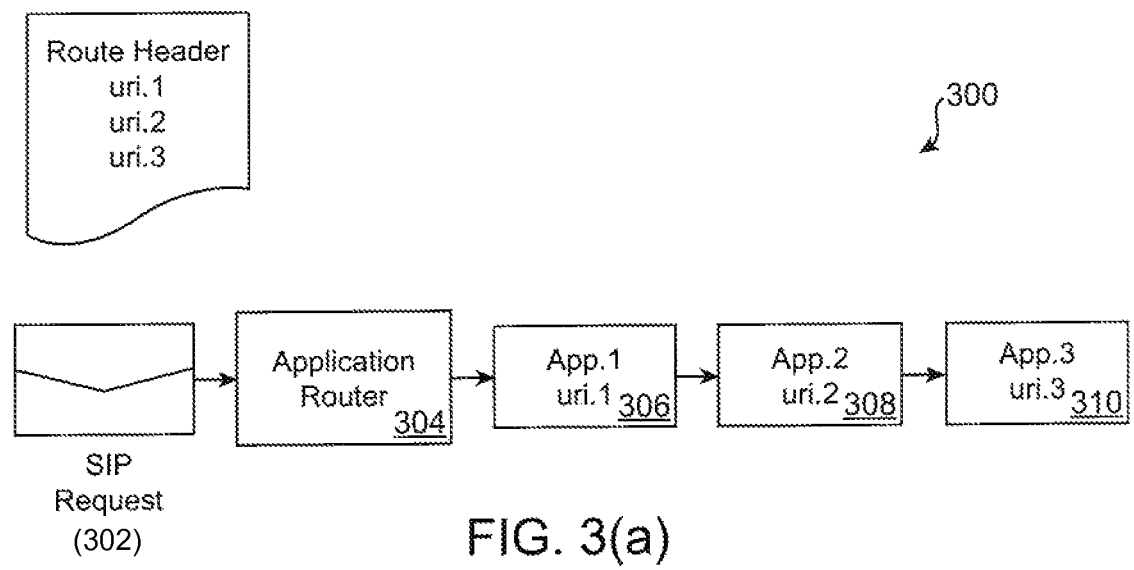
FIGS. 3(a) and 3(b) illustrate request routing modes that can be used in accordance with one embodiment of the present invention.
Figure 3B:
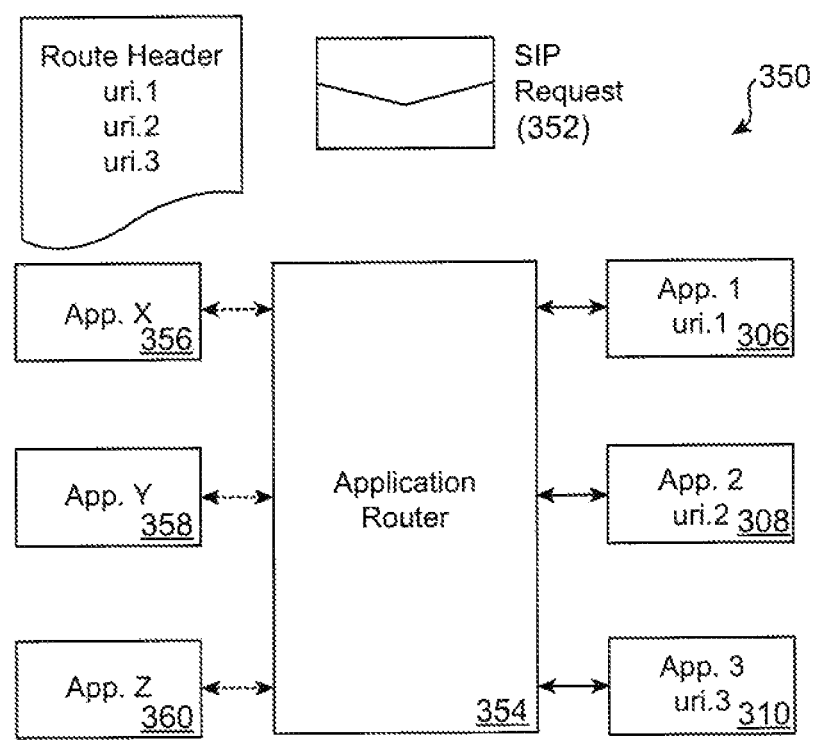

FIG. 3(b) illustrates an incremental mode of operation 350 for an application router in accordance with one embodiment. In an incremental mode, each application has the ability to route the request to another application. For example, a SIP message 352 can be received which includes a route header indicating that the application router 354 should route the message to first 306, second 308, and third applications 300 in order. Each of these applications, however, has the option to route the message to another application, such as applications X 356, Y 358, or Z 360. Since this is at the service level, the routing can be dynamic and be a function of the context (i.e., any policy can be used to decide how to route). The routing can be sequential or parallel (e.g., forking in SIP). These additional applications then can return the message to the router and/or routing application upon processing the message. Such functionality allows S-CSCF and SCIM functionality to be provided, in this case on SIP but with a call control enabler or an application dispatcher it can be also without SIP, even in the absence of IMS. The same can also be achieved with implementations specific for each network that expose on a particular network call control or application dispatching. Signaling messages/events thus can be routed in any desired way, and the headers also can be manipulated as desired. The policies can be dynamic and dynamically depend on any service layer context variable, logic, or delegate operations to any other appropriate resource.

When a target (such as any of the applications in FIGS. 3(a) and 3(b)) has completed the appropriate task, the signaling message/event may be returned to the application router which, based on a routing table and results of the service, application, or other target processing, can decide to route the message to another target. In the case of an application router which sits at the edge, the application router can directly manipulate the SIP messages. As policies reside in the service layer, control and/or programming of the application router can be used for the routing. As an application dispatcher can reside entirely at the service layer (that it be built on a call control enabler or directly against protocol specific implementation of the call control functions to perform), an implementation of SOA SCIM utilizing an application dispatcher can also allow the router to be fully programmed by policies, which can include any combination of at least one condition and action, and thus provides a policy-driven dispatching function. It also can be noted that an equivalent of an application router in SIP can be provided for any protocol, including legacy, PSTN, IN, etc. In one embodiment, the application dispatcher can act like an S-CSCF, except that instead of being a network component, the dispatcher is a service application that provides equivalent functionality. Since the dispatcher is a service application, the dispatcher executes in the service layer and has access to all the information in the service layer, and therefore is not limited to acting as a network component that does not have access to such information. And since a dispatcher can be programmed by policy that can invoke any information available via call or context at that level (i.e., much richer than what is available at the network layer), for example including any information about the presence, location, application specific data/context or user preference, subscription, etc., the dispatcher can execute virtually any combination of condition(s) and action(s) to determine the appropriate process(es) to be taken. Further information can be obtained via co-pending U.S. patent application Ser. No. 12/019,299 filed Jan. 24, 2008, entitled "Service-Oriented Architecture (SOA) Data Management of Data Repository," which is hereby incorporated herein by reference.

Another advantage to operating in the service layer in the converged container is that the different services can be integrated using an business process modeling/management language or SOA approach. In one embodiment, a business process execution language (BPEL) approach can be used for management and flow. Using such an approach, a SIP application can be provided that interacts with another SIP application, a messaging application or enabler, a presence application or enabler, a location application or enabler, etc., through a mechanism such as Web services, Java binding etc. In such an embodiment, a Web services task can be triggered for an incoming SIP message, which results in kicking off a workflow that can that will combine the applications to process the SIP message. This then is a true SOA composition as, instead of processing the message, the message is brought to the service layer and results in starting a workflow that combines multiple applications, each of which may have impact on the message. The result is essentially an SOA workflow that acts on the message. With an application dispatcher this can also be done on other protocols than SIP. The same statement can be made if the router is not based on SIP.

Figure 4:
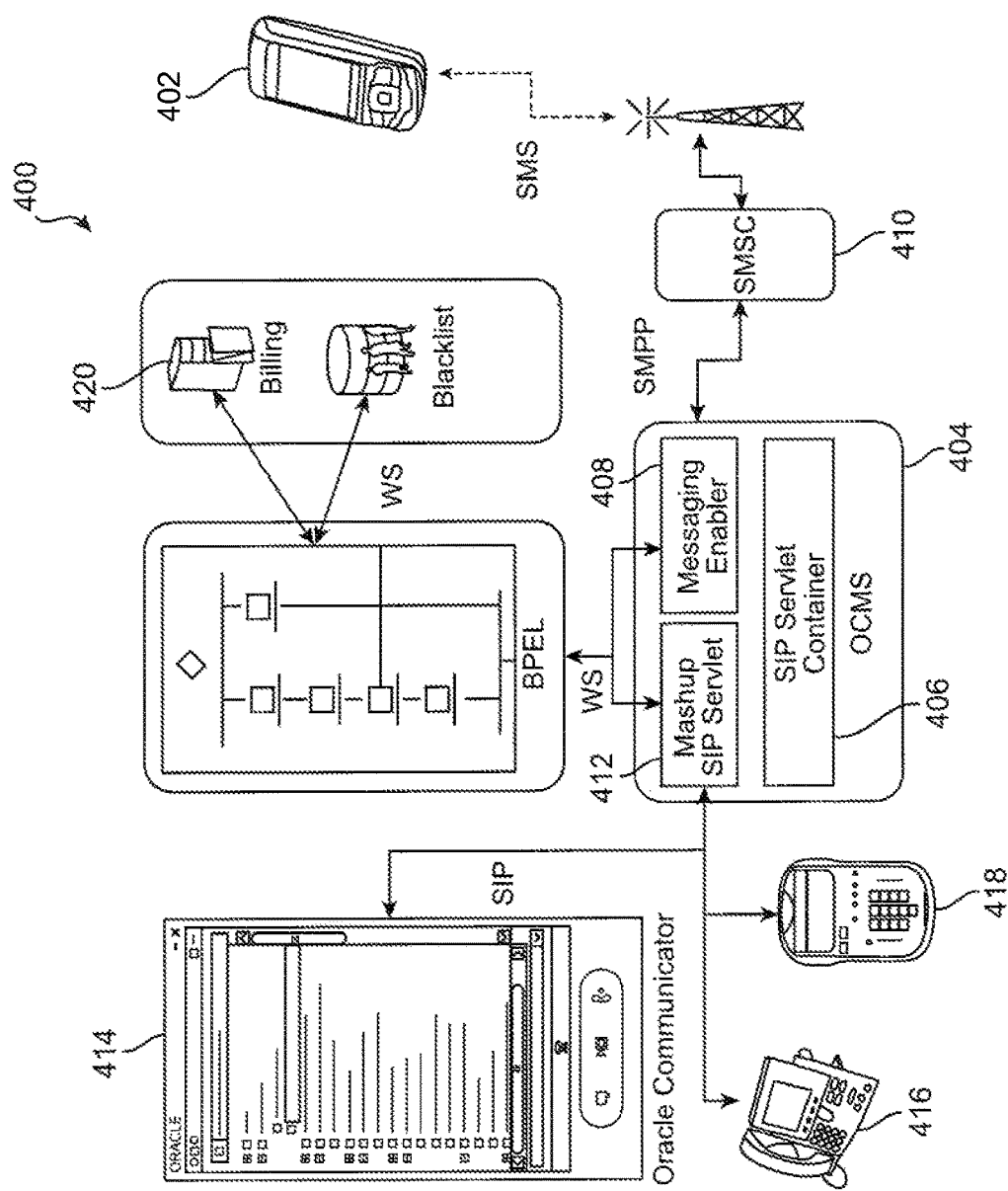
FIG. 4 illustrates flow for a prepaid SIP notification to an SMS-enabled device that can be used in accordance with one embodiment of the present invention.

FIG. 4 illustrates an example configuration 400 wherein a Session Initiation Procotol (SIP) notification is delivered to a short message service (SMS)-enabled device 402. In this example, a Communication and Mobility Server 404 is a converged J2EE and SIP Application Server that provides services such as Voice over IP, Presence, Instant Messaging, and an ability to create a multitude of other voice and multimedia services leveraging the SIP, Diameter, and other protocols. The server 404 includes a SIP servlet container 406 that extends the J2EE application server, providing a runtime environment for SIP applications, including services such as security, concurrency, life cycle management, transaction, deployment, and administration. The CMS SIP servlet container 406 provides network services for sending and receiving SIP requests and responses using a combination of transport protocols, IP addresses, and ports. The server 404 also includes a messaging enabler 208 that works with a Short Message Service Center 410 to send and receive SMS messages with the SMS-enabled device 402. Details for such an enabler can be found, for example, in co-pending U.S. patent application Ser. No. 11/939,705, filed Nov. 14, 2007, entitled "Intelligent Message Processing," which is hereby incorporated herein by reference. The server 404 also includes, in this example, a mashup SIP servlet 412 that plays the part of proxy router and that is able to utilize existing services to also send SIP messages to SIP-enabled devices 414, 416, 418. The mashup servlet 412 and messaging enabler 408 can take advantage of Web services to kickoff a BPEL workflow in order to handle processing for the message, such as to check whether there is sufficient balance in a billing database 420 for the pre-paid message and deduct the amount for the message from the amount. The workflow also can work cause the mashup servlet and messaging enabler to convert and send the pre-paid SIP message to the SMS-enabled device using the SMS protocol.

Besides cases using an application router or an application dispatcher, a system in accordance with one embodiment can receive a signal to an application in the service layer (e.g., in SIP, Parlay (OSA AS) or through a call control enabler. The application code then can determine the processing as well as where to send the call/session, such as by composing enablers or by hard coding the call of the enablers. The notion of a "call" should not be limited to voice or phone calls, for example, but should be interpreted to also cover any type of multimedia streaming session, for example, where appropriate.

Figure 5:
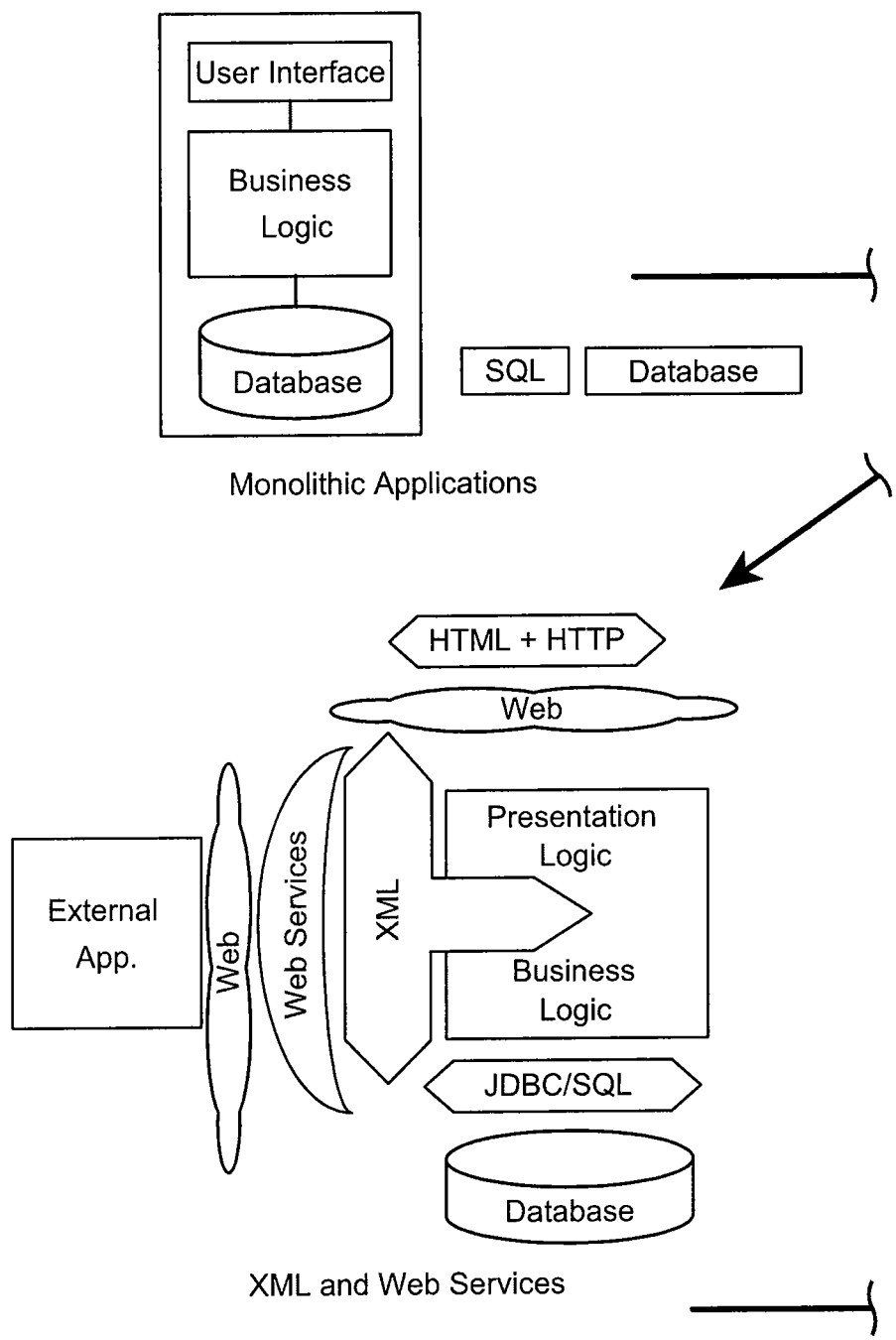
FIG. 5 illustrates an SOA-based architecture that can be used in accordance with one embodiment of the present invention.
Figure 5:
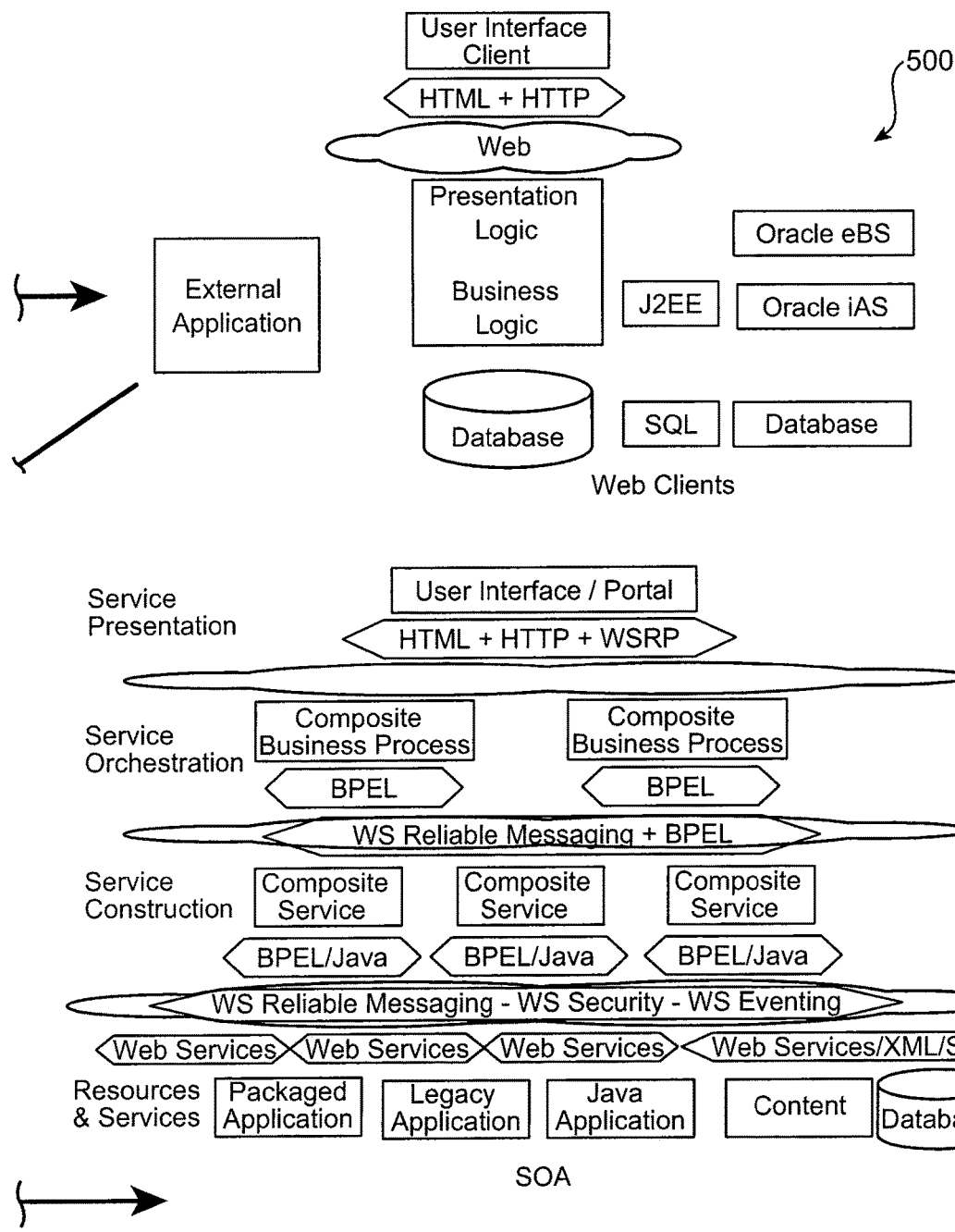
Figure 6:
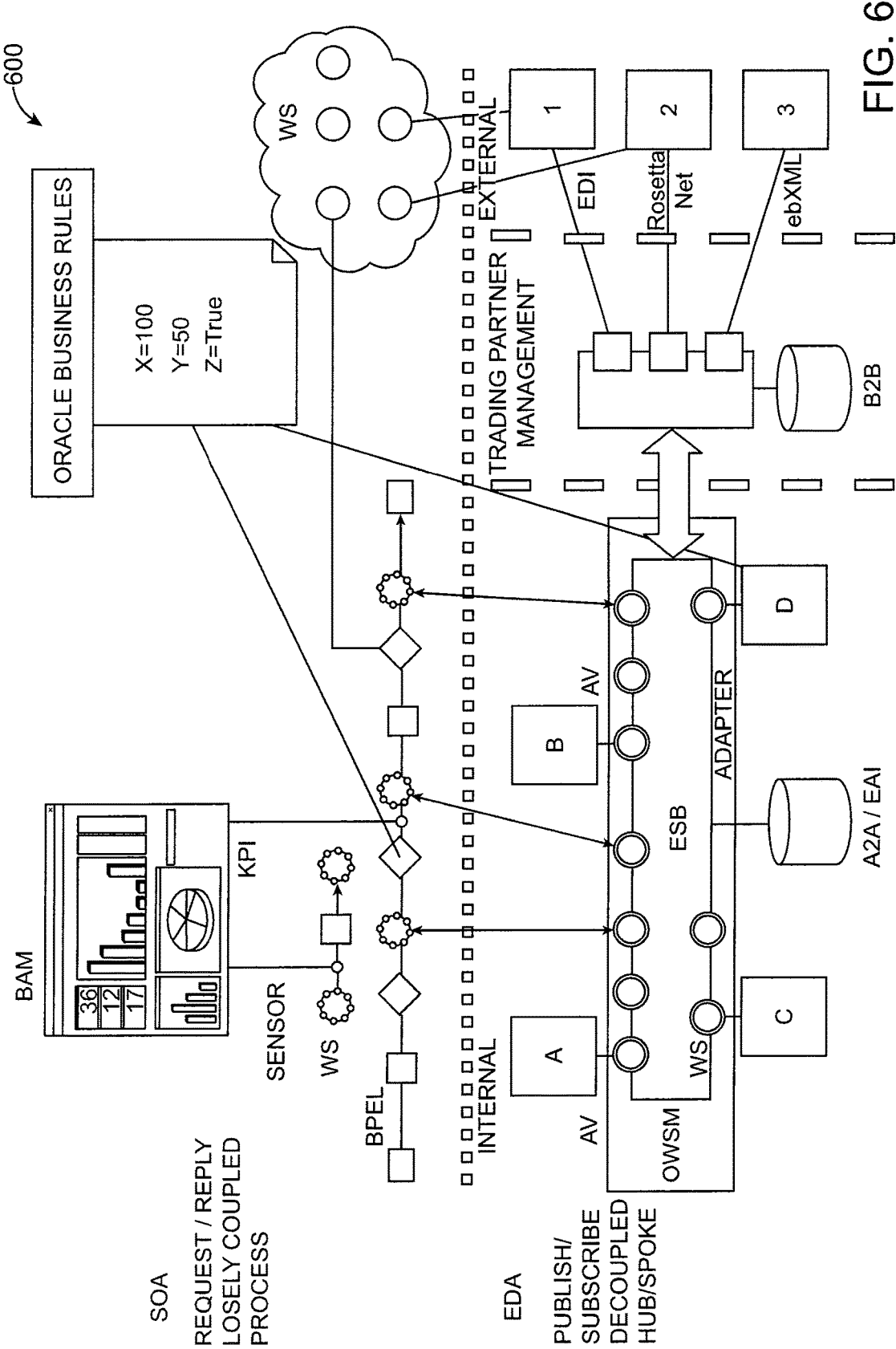
FIG. 6 illustrates an SOA/EDA-based architecture that can be used in accordance with one embodiment of the present invention.
Figure 7:
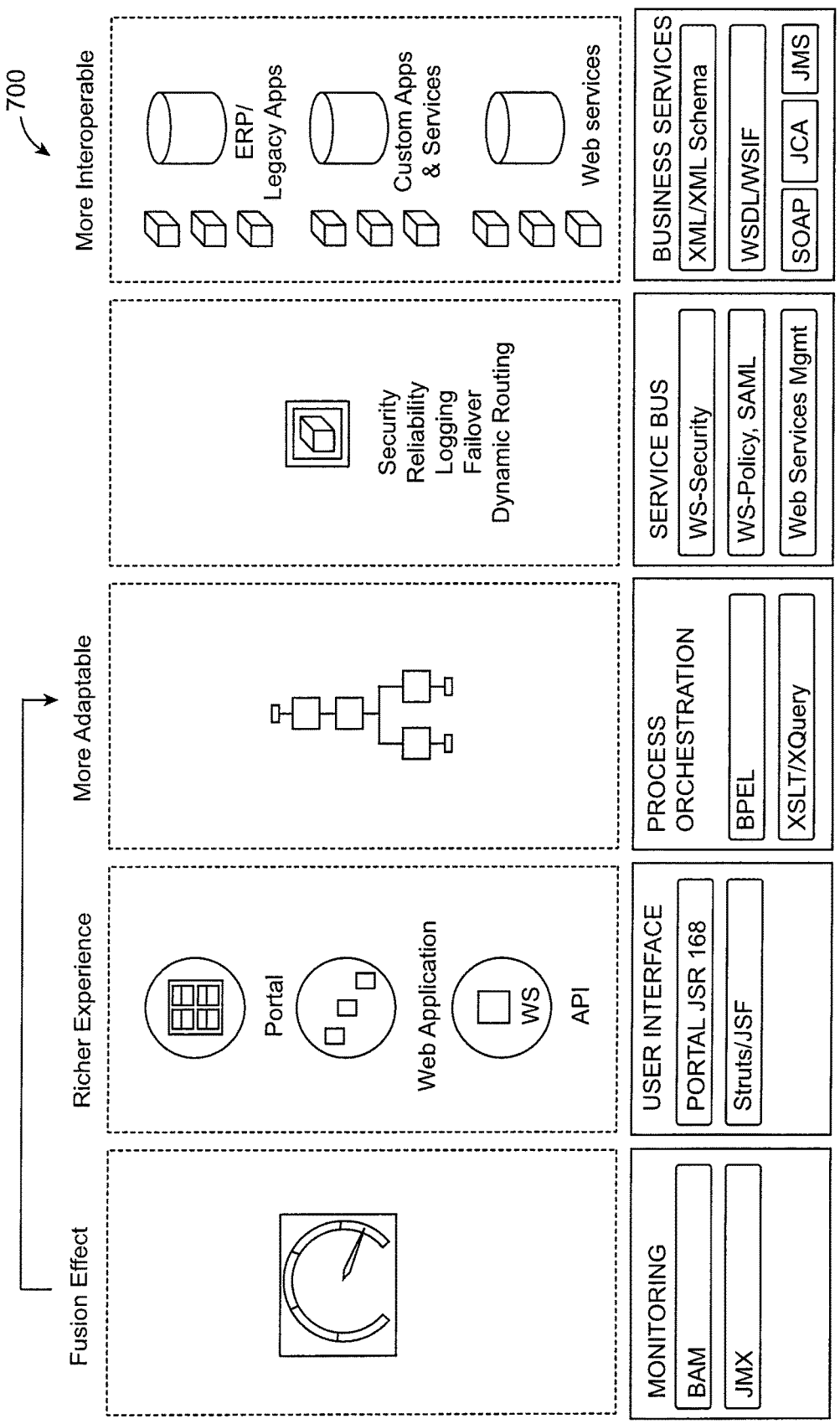
FIG. 7 illustrates some key SOA standards that can be implemented in various embodiments of the present invention.

FIG. 5 illustrates an example of a flow to process a request with a layered SOA-based architecture 500 that can be used with various embodiments. An SOA comprises a group of loosely coupled, highly interoperable and reusable modules to provide a framework for documenting enterprise capabilities and supporting integration and consolidation activities. The SOA provides a set of standard interfaces to a message-oriented and event-driven architecture that provides for orchestration by defining and supporting workflows and business processes. The flow of the architecture attempts to identify the characteristics of the SOA as a natural evolution of the programming model of the application. In one example, an application dispatcher sequences the application of services that will be applied to a message, and can do this sequencing in a dynamic fashion by routing of the message to the appropriate service based at least in part upon the result(s) of previous processing by at least one previous service or application. In this example, processing is routed from a monolithic application to Web clients and Web services, and subsequent processing at the SOA. A service in this context is a unit of work done by a service provider to achieve desired end results for a service consumer. FIG. 6 illustrates an architecture 600 relating a full service-oriented architecture (SOA) and event-driven architecture (EDA) in accordance with one embodiment. In this particular example, a BPEL workflow and Web services are used to coordinate calls between the SOA and EDA components, although this is merely for purposes of illustration and is not necessary as discussed above. Using such an approach, SOA is able to achieve loose coupling among interacting software agents. In this context, a service is a unit of work done by a service provider in order to obtain a desired result for a user or customer. FIG. 7 illustrates key SOA standards 700 at the present time, including BAM and JMX for monitoring; Portal JSR-168 and Struts/JSF for the user interface; BPEL and XSLT/XQuery for process orchestration; WS-Security, WS-Policy, SAML, and Web Services Management for the service bus; and XML/WML Schema, WSDL/WSIF, SOAP, JCA, and JMS for business services.

Besides cases using an application router or an application dispatcher, a system in accordance with one embodiment can receive a signal to an application in the service layer (e.g., in SIP, Parlay (OSA AS) or through a call control enabler. The application code then can determine the processing as well as where to send the call/session, such as by composing enablers or by hard coding the call of the enablers. The notion of a "call" should not be limited to voice or phone calls, for example, but should be interpreted to also cover any type of multimedia streaming session, for example, where appropriate.

Figure 8:
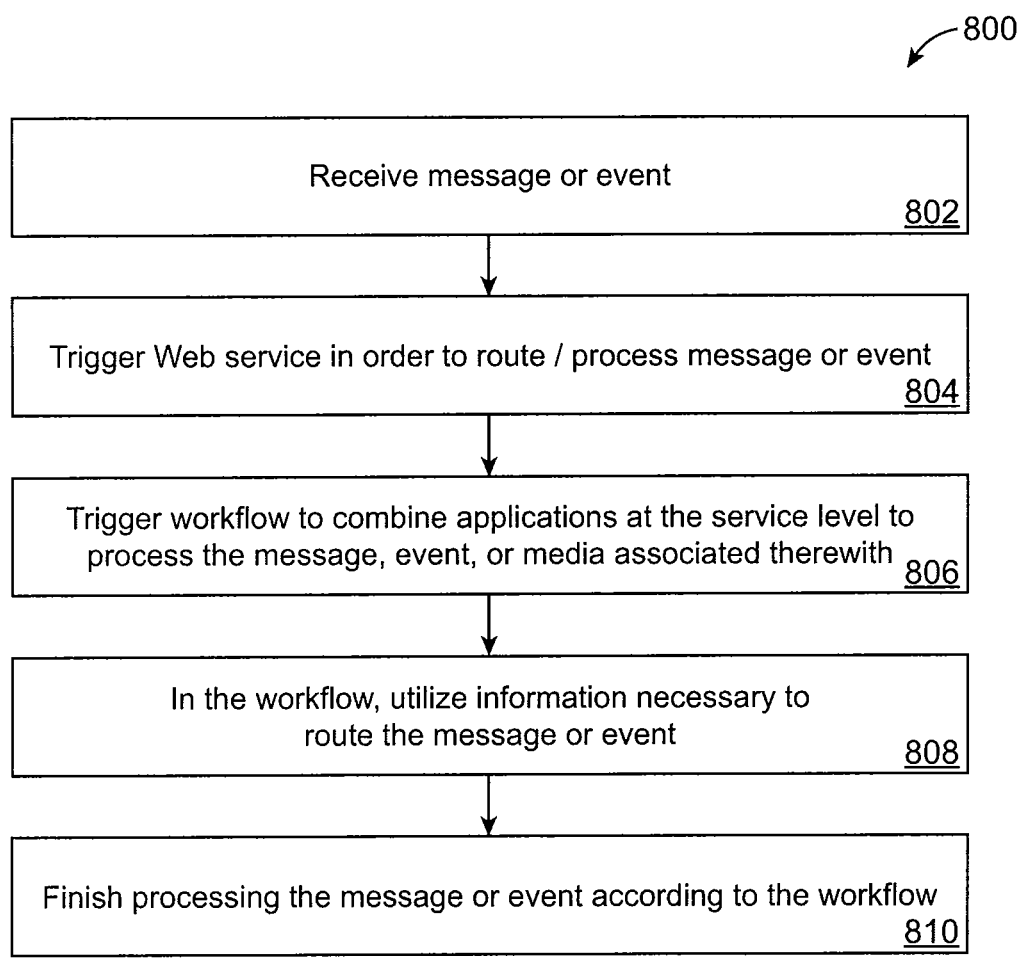
FIG. 8 illustrates a steps of an exemplary method that can be used in accordance with one embodiment of the present invention.

FIG. 8 illustrates an exemplary method 800 in accordance with one embodiment of the present invention for processing a request using such an architecture. In this example, a signaling message/event is received 802 that results in a Web service being triggered 804. The Web service in turn triggers a SOA workflow, such as an SOA workflow, capable of combining applications at the service level to process the signaling message/event 806. The workflow can utilize information to route the signaling message/event 808. The information can include, for example, information from a routing table for the signaling message/event as well as information from previous services or applications. As discussed elsewhere herein, routing can be done using an application router or dispatcher, as well as in SIP AS converged with other SDP items, and by composing enabler, including the case where an application uses a call control enabler. While each of these implementations can support the same flow, the information used to route the message may be different as described elsewhere herein. The workflow further can examine other information, such as user preference and/or presence information, to determine how to route the signaling message/event. For example, if a SIP message is received for a user that is present on a particular device, the workflow can examine the user presence and preference information to determine that the user wishes to receive the message to that particular device as an SMS message when present at that device. The message then is processed dynamically according to the workflow 810. In this example, the SIP message is converted to an SMS message and routed to the user device. The system then waits for a response, and if the user responds via SMS, the system will change the response to SIP and direct it to the appropriate address. The advantages to such a dynamic SOA composition thus can be seen.

In various embodiments, the use of a service delivery platform provides for multiple levels of granularity with regard to SCIM functionality. For example, a simple level of SCIM functionality involves coordinating the invocation of multiple SIP application server instances relative to each other. For example, an incoming SIP request may first need to be routed to a presence server, after which the request may need to be forwarded to the call control server, depending on availability of the other party. In general, for initial SIP messages (e.g., an INVITE), a processing/routing order for the multiple A/S instances is determined dynamically (based on information in the SIP message as well as subscriber profile information). When using an Oracle M2CE SIP/J2EE Application Server, for example, which is a programmable software platform, this functionality can be very easily implemented in such an environment.

The SCIM also can act as a Back-To-Back User Agent (B2BUA), a SIP-based logical entity that can receive and process INVITE messages as a SIP User Agent Server (UAS), and can modify the initial request on behalf of an S-CSCF. This capability obviates the need for the S-CSCF to be re-implemented to include the B2BUA functionality, even when required by appropriate application behavior. In a simple example, an initial INVITE may start a Voice over IP (VoIP) session with only an audio codec. Once the session has been established, it may be necessary to add video codec capability to this session, and at the same time manage the resources involved in the audio and video conference on behalf of the user or application. If the S-CSCF is not able to function as a B2BUA, this situation can be handled quite easily by the SCIM approach, which adds the video codec (and related media server) to the call leg transparent to the S-CSCF.

Such functionality can be provided by an application dispatcher as described above. The application dispatcher can act as a policy evaluation and enforcer application and/or proxy router, such as is further described in U.S. patent application Ser. No. 11/383,024, filed May 12, 2006, entitled "SIP Routing Customization," as well as U.S. patent application Ser. No. 11/536,731, filed Sep. 29, 2006, entitled "Service Provider Functionality With Policy Enforcement Functional Layer Bound to SIP," each of which is hereby incorporated herein by reference.

A policy enforcement component thus can intercept SIP messages when reaching the proxy, at the level of the location server or on the path between the location and proxy router. Such a component can also intercept a message in front of a target for a SIP message (e.g., the target of a call) or on outgoing SIP messages (e.g., when the sender initiates a call). The policies are evaluated and enforced as any combination of condition and actions that may manipulate the header and routing. As a result, it is possible that a call or incoming or outgoing request (and subsequent messages) can be routed to a series of applications (in parallel or in series) responsible to perform tasks such as call barring, call forwarding, checking presence, and routing based on presence, although any processing of a call or media session can be considered/implemented by a service composed by the SOA-based SCIM.

The SCIM function also can co-ordinate, orchestrate, and manage capabilities that are SIP-specific, as well as capabilities that are not SIP-specific. For example, a Parlay X gateway may expose messaging capability through a Parlay X API and play the role of an OSA SCS/SCF in a specific IMS deployment. Proper behavior of an application might require that a Serving CSCF direct an incoming request through a number of SIP A/S instances, followed by routing to the OSA SCS/SCF for some messaging related functionality. This kind of SCIM functionality typically will be layered on top of the more fine-grained SIP A/S orchestrations that take place through SCIM functionality described above. This coarse-grained service orchestration, management, and composition can easily be implemented using BPEL and ESB functionalities. This naturally results from the notion of an enabler and an SOA/EDA architecture. Enablers are composed, such as via BPEL, Java composition, WS composition, or any other technology. Any other service or component can be orchestrated and/or composed as needed. This is natural to an SOA platform or environment.

For various embodiments, policy models can be used as are described in co-pending U.S. patent application Ser. No. 11/024,160, filed Dec. 27, 2004, entitled "Policies as Workflows," and U.S. patent application Ser. No. 11/565,578, filed Nov. 30, 2006, entitled "Orchestration of Policy Engines and Format Technologies," each of which is hereby incorporated herein by reference. Policies then amount to workflow or orchestration of the SIP processing performed on the SIP message. This supports the above functionality as a particular case where, instead of orchestrating SIP applications, one orchestrates which SIP server is to be used.

The same mechanism also can be used to perform SIP load balancing, as well as balancing for other protocols. In such a scenario, the policies used can check the status of the network and/or load of the servers and applications. The policies can preferably also route a signaling message/event based on the session itself, wherein a signaling message/event for an existing session goes to same server, and otherwise is routed based on balancing considerations. If the signaling message/event for a session cannot go to the same server, then the servers must be able to share state information such that a server receiving the new message can load the state information from the server handling the prior signaling message/event in the session. Such a mechanism can be provided using, for example, JGroup in J2EE. U.S. patent application Ser. No. 11/670,150, filed Feb. 1, 2007, entitled "Staging Latency Performances and Orchestrating Network Resources with Low Latency Requirements," which is hereby incorporated herein by reference, describes examples of how to orchestrate network level aspects with enablers that are appropriately designed to factor out, layer by layer, the need to respond rapidly.

Thus, instead of doing SCIM at the level of the network components, such as by using an S-CSCF or an isolated network component that is the target of the S-CSCF, or even an isolated silo SIP application server, SCIM can be utilized as part of the horizontal service layer in an SOA-based approach. SCIM composition then can be provided at three different levels, including the level of composition itself, such as in the converged SIP application server where the servlets can have full access to the context of the information coming from the rest of the service layer. SCIM composition also can be provided at the level of an application running in that environment, which has the role of dispatching the SIP messages to multiple applications and multiple services capable of processing the signaling message/event. So instead of the functionality residing in the session layer, the functionality resides in the service layer, such that the function has access to all the contextual information in the service layer. The function also can be completely programmed, or at least considered as being programmed, by policies. The routing decision then is the result of processing of any combination of conditions and actions. Eventually, because the functionality is in the service layer in that environment, an incoming SIP message can essentially result in an application being triggered in the service layer, which is essentially composed of a previous composition of other applications that can process the message or contribute to the processing of the message. In other words, as a result of the SIP servlet that could represent an application being activated by the incoming SIP message, a Web service is triggered that in turn triggers a BPEL workflow that itself triggers multiple operations that can apply to the SIP message as well as the rest of the environment.

Figure 9:
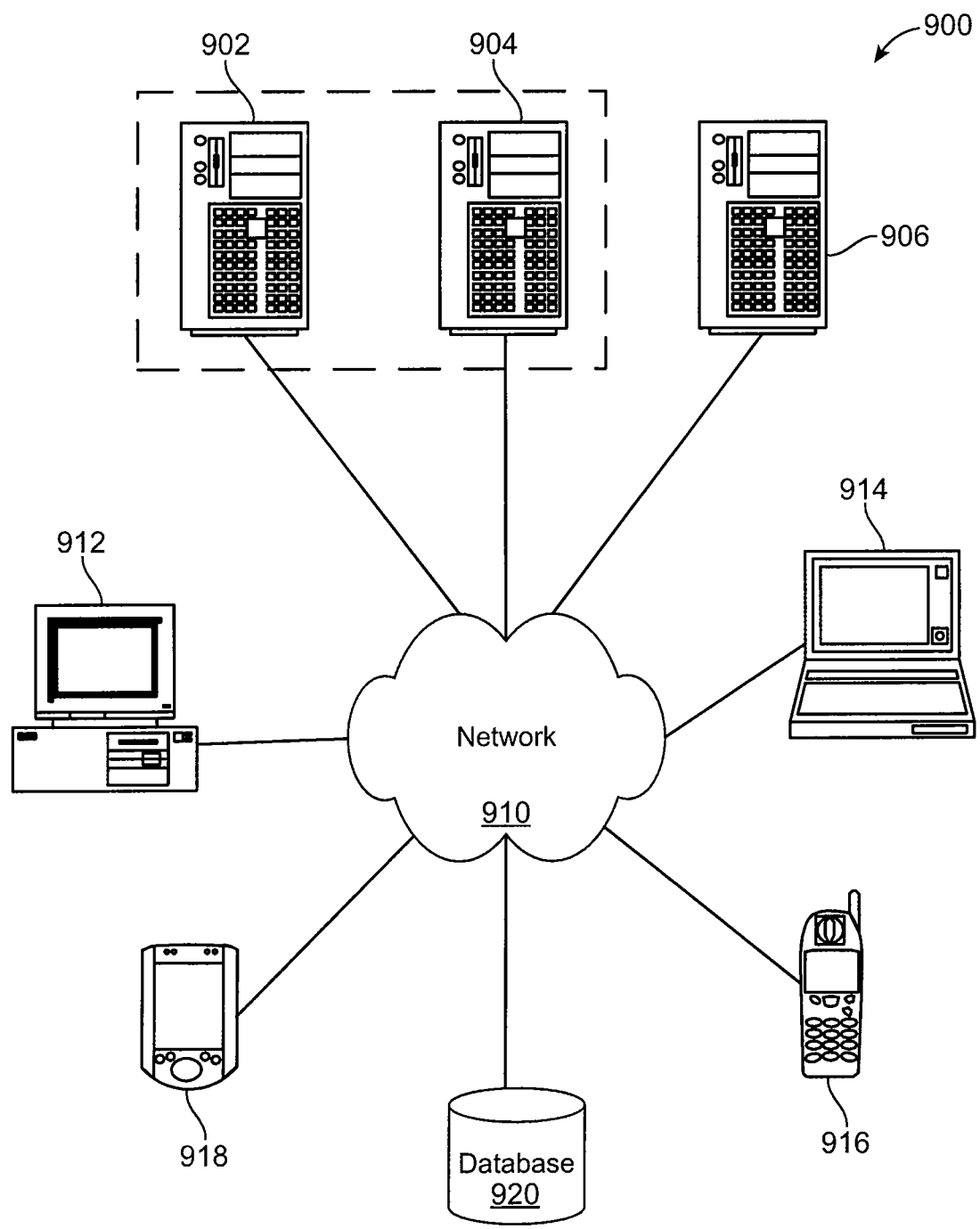
FIG. 9 illustrates components of a computer network that can be used in accordance with one embodiment of the present invention.

FIG. 9 is a block diagram illustrating components of an exemplary operating environment in which various embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry®, or other communication protocol enabled), and/or workstation computers running any of a variety of commercially-available UNIX® or UNIX-like operating systems (including without limitation, the variety of GNU/Linux® operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network may can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
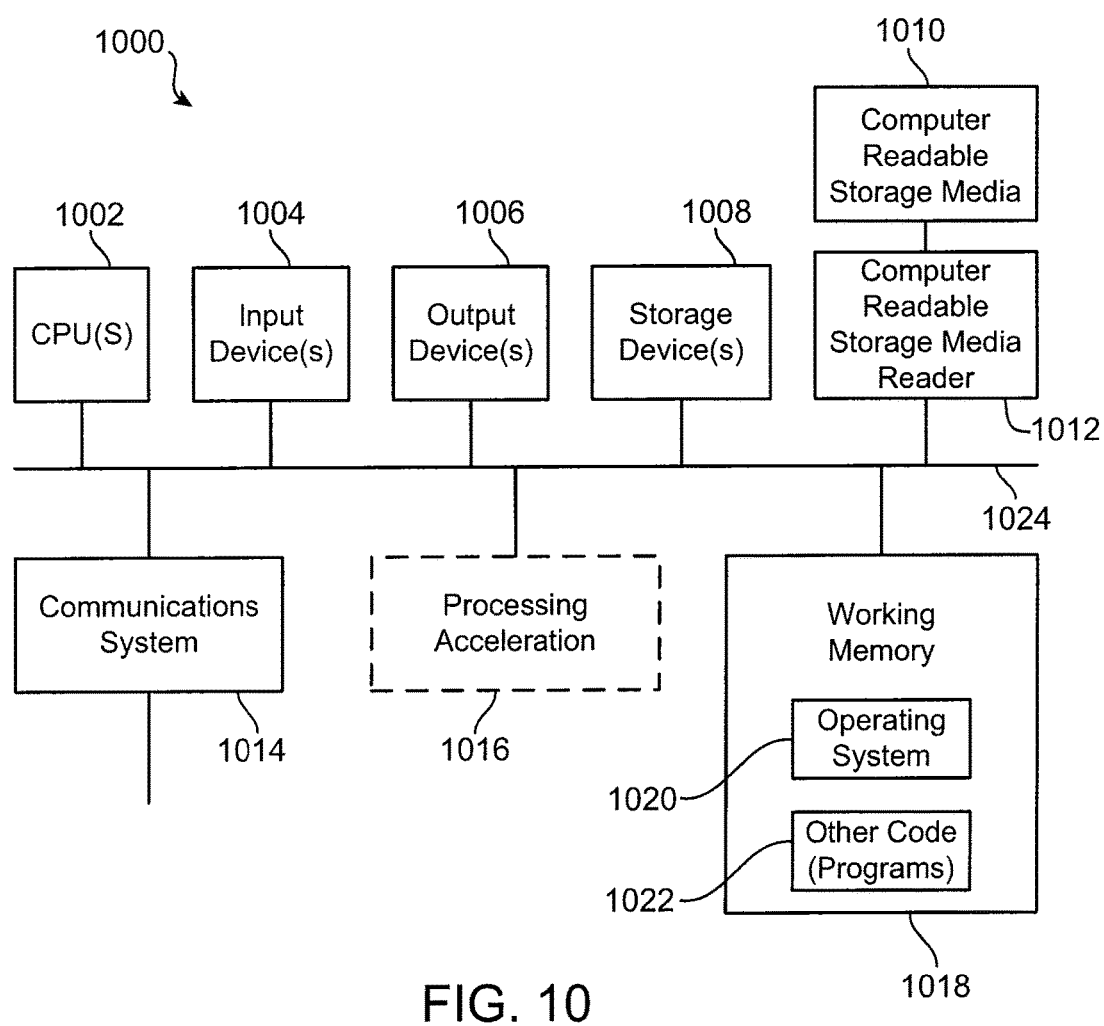
FIG. 10 illustrates components of a computerized device that can be used in accordance with one embodiment of the present invention.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for processing requests, the system comprising:
   one or more processors; and
   a memory coupled with the processors and having stored therein a sequence of instructions executed by the processors to execute:
      a first layer comprising a plurality of applications that provide telephony control features, the plurality of applications comprising an application dispatcher;
      a second layer comprising a plurality of abstract call control enablers comprising:
         one or more call control enabler interfaces;
         one or more Application Program Interfaces (APIs) providing an abstract interface for invoking a plurality of call control functions,
      a third layer comprising a plurality of call control enabler instances that provide adapters to network resources to provide the plurality of call control functions, wherein one or more of the call control enabler instances are instantiated in response to one of the plurality of applications invoking one or more of the plurality of call control functions through the APIs; and
      a fourth layer comprising a network layer of a plurality of network resources that are each coupled to corresponding ones of the call control enabler instances;
      wherein the system is configured to perform operations comprising:
         receiving, by the application dispatcher, a Session Initiation Protocol (SIP) request;
         analyzing, by the application dispatcher, the request to extract a plurality of Uniform Resource Identifiers (URIs) to process the request from a header field of the request;
         dynamically determining, by the application dispatcher, a first application to process the request based on a first URI in the plurality of URIs in the header field, subscriber profile information, and one or more policies, wherein the determination is made in the first layer;
         routing the request to the first application to process the request;
         receiving a response from the first application after processing the request;
         dynamically determining, by the application dispatcher, a second application to process the request based on a second URI in the plurality of URIs in the header field, the response from the first application, the subscriber profile information, and the one or more policies; and
         routing the request to the second application to process the request.

2. The system of claim 1, wherein the application dispatcher comprises a Service Capability Interaction Manager (SCIM)-based component operable to determine applications used to process the request.

3. The system of claim 1, wherein the application dispatcher dynamically determines the second application to process the request based at least in part on load balancing.

4. The system of claim 1, wherein the system is further configured to perform operations comprising:
   executing a Web services component programmed to direct the request to the application dispatcher.

5. The system of claim 1, wherein:
   the application dispatcher comprises a service layer dispatching component programmed to process the request based at least in part on a routing table or a routing application.

6. The system of claim 1, wherein the plurality of call control enabler instances comprises instances for interfacing or adapting to Parlay-based resources.

7. The system of claim 1, wherein the plurality of call control enabler instances comprises an SIP servlet providing an interface to an IP Multimedia Subsystem (IMS).

8. The system of claim 1, wherein routing the request to the first application to process the request includes launching a Service Oriented Architecture (SOA) process.

9. A non-transitory, computer-readable medium comprising instructions for processing requests, the instructions executed by one or more processors to perform operations comprising:
   generating a first layer comprising a plurality of applications that provide telephony control features, the plurality of applications comprising an application dispatcher;
   generating a second layer comprising a plurality of abstract call control enablers comprising:
      one or more call control enabler interfaces;
      one or more Application Program Interfaces (APIs) providing an abstract interface for invoking a plurality of call control functions,
   generating a third layer comprising a plurality of call control enabler instances that provide adapters to network resources to provide the plurality of call control functions, wherein one or more of the call control enabler instances are instantiated in response to one of the plurality of applications invoking one or more of the plurality of call control functions through the APIs;
   generating a fourth layer comprising a network layer of a plurality of network resources that are each coupled to corresponding ones of the call control enabler instances;
   receiving, by the application dispatcher, a Session Initiation Protocol (SIP) request;
   analyzing, by the application dispatcher, the request to extract a plurality of Uniform Resource Identifiers (URIs) to process the request from a header field of the request;
   dynamically determining, by the application dispatcher, a first application to process the request based on a first URI in the plurality of URIs in the header field, subscriber profile information, and one or more policies, wherein the determination is made in the first layer;
   routing the request to the first application to process the request;
   receiving a response from the first application after processing the request;
   dynamically determining, by the application dispatcher, a second application to process the request based on a second URI in the plurality of URIs in the header field, the response from the first application, the subscriber profile information, and the one or more policies; and routing the request to the second application to process the request.

10. The non-transitory, computer-readable medium of claim 9, wherein the application dispatcher comprises a Service Capability Interaction Manager (SCIM)-based component operable to determine applications used to process the request.

11. The non-transitory, computer-readable medium of claim 9, wherein the application dispatcher dynamically determines the second application to process the request based at least in part on load balancing.

12. The non-transitory, computer-readable medium of claim 9, comprising additional instructions that cause the one or more processors to perform additional operations comprising executing a Web services component programmed to direct the request to the application dispatcher.

13. The non-transitory, computer-readable medium of claim 9, wherein the application dispatcher comprises a service layer dispatching component programmed to process the request based at least in part on a routing table or a routing application.

14. The non-transitory, computer-readable medium of claim 9, wherein the plurality of call control enabler instances comprises instances for interfacing or adapting to Parlay-based resources.

15. The non-transitory, computer-readable medium of claim 9, wherein the plurality of call control enabler instances comprises an SIP servlet providing an interface to an IP Multimedia Subsystem (IMS).

16. The non-transitory, computer-readable medium of claim 9, wherein routing the request to the first application to process the request includes launching a Service Oriented Architecture (SOA) process.

17. A method for processing requests, the method comprising:
    generating a first layer comprising a plurality of applications that provide telephony control features, the plurality of applications comprising an application dispatcher;
    generating a second layer comprising a plurality of abstract call control enablers comprising:
        one or more call control enabler interfaces;
        one or more Application Program Interfaces (APIs) providing an abstract interface for invoking a plurality of call control functions,
    generating a third layer comprising a plurality of call control enabler instances that provide adapters to network resources to provide the plurality of call control functions, wherein one or more of the call control enabler instances are instantiated in response to one of the plurality of applications invoking one or more of the plurality of call control functions through the APIs;
    generating a fourth layer comprising a network layer of a plurality of network resources that are each coupled to corresponding ones of the call control enabler instances;
    receiving, by the application dispatcher, a Session Initiation Protocol (SIP) request;
    analyzing, by the application dispatcher, the request to extract a plurality of Uniform Resource Identifiers (URIs) to process the request from a header field of the request;
    dynamically determining, by the application dispatcher, a first application to process the request based on a first URI in the plurality of URIs in the header field, subscriber profile information, and one or more policies, wherein the determination is made in the first layer;
    routing the request to the first application to process the request;
    receiving a response from the first application after processing the request;
    dynamically determining, by the application dispatcher, a second application to process the request based on a second URI in the plurality of URIs in the header field, the response from the first application, the subscriber profile information, and the one or more policies; and
    routing the request to the second application to process the request.

18. The method of claim 17, wherein the application dispatcher comprises a Service Capability Interaction Manager (SCIM)-based component operable to determine applications used to process the request.

19. The method of claim 17, wherein the application dispatcher dynamically determines the second application to process the request based at least in part on load balancing.

20. The method of claim 17, further comprising executing a Web services component programmed to direct the request to the application dispatcher.

21. The method of claim 17, wherein the application dispatcher comprises a service layer dispatching component programmed to process the request based at least in part on a routing table or a routing application.

22. The method of claim 17, wherein the plurality of call control enabler instances comprises instances for interfacing or adapting to Parlay-based resources.

23. The method of claim 17, wherein the plurality of call control enabler instances comprises an SIP servlet providing an interface to an IP Multimedia Subsystem (IMS).

24. The method of claim 17, wherein routing the request to the first application to process the request includes launching a Service Oriented Architecture (SOA) process.

* * * * *

UNITED STATES PATENT AND TRADEMARK OFFICE
CERTIFICATE OF CORRECTION

| | |
|---|---|
| PATENT NO. | : 9,654,515 B2 |
| APPLICATION NO. | : 12/018718 |
| DATED | : May 16, 2017 |
| INVENTOR(S) | : Stephane H. Maes |

It is certified that error appears in the above-identified patent and that said Letters Patent is hereby corrected as shown below:

In the Specification

Column 3 Line 47:
Please remove "a an" and insert --an--

Column 6 Line 39:
Please remove "enbaler" and insert --enabler--

Column 10 Line 43:
Please remove "lever1" and insert --level--

Column 11 Line 1:
Please remove "RouteHeader" and insert --Route Header--

Column 12 Line 36:
Please remove "Procotol" and insert --Protocol--

Column 17 Line 16:
Please remove "GRPS" and insert --GPRS--

Signed and Sealed this
Twenty-eighth Day of May, 2019

Andrei Iancu
*Director of the United States Patent and Trademark Office*